United States Patent [19]
Watanabe et al.

[11] Patent Number: 6,038,865
[45] Date of Patent: Mar. 21, 2000

[54] TEMPERATURE-CONTROLLED APPLIANCE

[75] Inventors: Hideo Watanabe, Kawasaki; Motohiro Sakai, Yokohama; Hirofusa Tezuka, Norboribetsu, all of Japan

[73] Assignee: Thermovonics Co., Ltd., Kanagawa, Japan

[21] Appl. No.: 08/895,548

[22] Filed: Jul. 16, 1997

[30] Foreign Application Priority Data

| Jul. 16, 1996 | [JP] | Japan | 8-186434 |
| Jul. 17, 1996 | [JP] | Japan | 8-187775 |
| Jul. 17, 1996 | [JP] | Japan | 8-187780 |

[51] Int. Cl.⁷ ................................................. F25B 21/02
[52] U.S. Cl. ................................ 62/3.6; 62/3.3; 62/258
[58] Field of Search ................................ 62/3.2, 3.3, 3.6, 62/3.7, 3.62, 258

[56] References Cited

U.S. PATENT DOCUMENTS

| 2,943,452 | 7/1960 | Buchanan | 62/3.3 |
| 2,970,450 | 2/1961 | Roeder et al. | 62/3.3 |
| 3,209,547 | 10/1965 | Elfving | 62/3.6 |
| 3,216,204 | 11/1965 | Milligan et al. | 62/3.2 |
| 3,220,198 | 11/1965 | Muller et al. | 62/3.6 |
| 4,089,184 | 5/1978 | Beitner | 62/3.62 |
| 4,848,091 | 7/1989 | Border | 62/3.2 |
| 4,947,648 | 8/1990 | Harwell et al. | 62/3.2 |
| 5,456,164 | 10/1995 | Bang | 99/468 |
| 5,588,300 | 12/1996 | Larsson et al. | 62/3.61 |
| 5,603,220 | 2/1997 | Seaman | 62/3.7 |
| 5,661,978 | 9/1997 | Holmes et al. | 62/3.6 |
| 5,689,957 | 11/1997 | DeVilbiss et al. | 62/3.7 |
| 5,718,124 | 2/1998 | Senecal | 62/457.6 |

FOREIGN PATENT DOCUMENTS

2-111364   9/1990   Japan .

*Primary Examiner*—William Doerrler
*Attorney, Agent, or Firm*—Evenson, McKeown, Edwards & Lenahan, PLLC

[57] ABSTRACT

A temperature-controlled appliance is provided with mutually-independent temperature-controlled compartments arranged close to each other. Each of the compartments comprises a casing formed of a heat-insulating layer, a thermal conductor arranged in the casing and provided with a heat-conducting surface located opposite a storage space in the casing, a Peltier device thermally connected with the thermal conductor, a power supply for feeding electric power to the Peltier device, and a controller for controlling electric power to be fed to the Peltier device so that a temperature in the casing is controlled.

28 Claims, 27 Drawing Sheets

TEMPERATURE-CONTROLLED APPLIANCE

BACKGROUND OF THE INVENTION a) Field of the Invention

This invention relates to temperature-controlled appliances useful at home or the like and having combined functions such as freezing, cold storage (refrigeration), defrosting and warm storage of foods and the like, and especially to temperature-controlled appliances making use of Peltier devices.

b) Description of the Related Art (First related art)

In a general household refrigerator of the compressor type, a freezer compartment and a refrigerator compartment are located at specific places. Their capacities are fixed, namely, unchangeable, and their temperatures cannot be set to any values outside corresponding predetermined ranges. Defrosting of a frozen food has been conducted at a place different from the refrigerator, for example, in a microwave oven.

(Second related art)

Keeping in step with the availability of longer leisure time in recent years, there is an increasing tendency toward enjoying outdoor activities, parties and the like. This has led to increasing developments of portable coolers. FIGS. 36 and 37 illustrate such conventional portable coolers.

In the portable cooler of FIG. 36, a metallic container 1102 made, for example, of aluminum is arranged inside a heat-insulating container 1101, and a peltier device 1105 is disposed in a side wall 1103 of the metallic container 1102 at substantially a middle position with a heat-absorbing-side thermal conductor 104 interposed between the Peltier device 1105 and the side wall 1103.

A heat-dissipating-side fins 1106 are arranged in contact with an outer side of the Peltier device 1105. A heat-dissipating fan 1107 is arranged in a close proximity of the fins 1106. An opening of the heat-insulating container 1101, said opening is located at a top of the heat-insulting container, is closed by a heat-insulating cover 1108.

Transfer of heat in the portable cooler takes place in the order of the metallic container 1102→the heat-absorbing-side thermal conductor 1104→the Peltier device 1105→the heat-dissipating-side fins 1106. The heat-dissipating-side fins 1106 are cooled by air from the fan 1107.

In the portable cooler of FIG. 37, a heat-insulating cover 1108 is provided with a heat-absorbing-side thermal conductor 1109, a heat-absorbing-side thermal conductor 1104, a Peltier device 1105, heat-dissipating-side fins 1106 and the like. A heat-absorbing-side fan 1110 is arranged inside a heat-insulating container 1101. In this case, a material placed for being chilled within the heat-insulating container 1101 is indirectly chilled by a stream of air produced by the heat-absorbing-side fan 1110.

(Third related art)

Frozen foods include frozen seafoods, meat (including poultry and game), vegetables and processed frozen foods. For defrosting these foods, there are a variety of methods, for example, air defrosting methods such as stationary air defrosting, humidified-air blast defrosting and compressed-air blast defrosting; water defrosting methods such as water-dipping defrosting, spray defrosting and steam defrosting; contact defrosting methods such as contact defrosting and aluminum contact defrosting; and electric defrosting methods such as electric resistance defrosting, dielectric heating defrosting (high-frequency defrosting and microwave defrosting), far infrared defrosting, and electrostatic defrosting. For each of these defrosting methods, various proposals have been made.

Concerning freezing of foods and the like, it has been the conventional practice, except for certain special cases, to place a desired food, for example, meat, fish, a vegetable or the like in a freezer compartment of a refrigerator and to freeze it by spending a lot of time.

(First problems)

In the refrigerator according to the first related art, the capacities of the freezer compartment and refrigerator compartment have been specified beforehand. If frozen foods are bought in a large quantity, the frozen foods cannot be stored in their entirety in the freezer compartment so that some of them have to be stored in the refrigerator compartment. Therefore the frozen foods placed in the refrigerator compartment are defrosted and can no longer remain in the frozen state.

In freezing, a food which is desired to be frozen ad has a high temperature is placed in a freezer compartment in which frozen foods have already been stored. This causes temperatures of the foods, which have been stored in a frozen state, rise locally, thereby possibly deteriorating the quality of the foods.

Further, the capacities of a freezer compartment and a microwave oven are fixed in the conventional art. Accordingly they cannot freeze or defrost a great deal of foods at once, leading to the inconvenience that long time is needed for freezing and defrosting.

(Second problems)

The portable cooler of the indirect cooling system, which is shown in FIG. 36 and pertains to the second related art, is poor in cooling efficiency. Moreover, the heat-insulating cover 108 is heavy because of the arrangement of the heat-absorbing-side thermal conductor 1109, the heat-absorbing-side thermal conductor 1104, the Peltier device 1105, the heat-dissipating-side fins 1106 and the like. In addition, it is necessary to arrange the heat-dissipating fan 1107 near the heat-dissipating-side fin 1106. Furthermore, the heat-insulating cover 1108 is provided on the inner side thereof with the heat-absorbing-side thermal conductor 1109, leading to drawbacks such that certain limitations are imposed on open/close operation of the heat-insulating cover 1108 and the portable cooler itself does not have much design tolerance.

The portable cooler shown in FIG. 37 is also from the drawback that efficent cooling cannot be obtained from the consumed electric power. The present inventors have studied this matter in various ways. As a result, it has been found that the poor cooling effects can be attributed to the arranged position of the Peltier device 1105 and the position of the upper edge of the metallic container 1102.

This will be described specifically. In the conventional portable cooler, the Peltier device 1105 is arranged in only one (i.e., the side wall 1103) of the side walls of the metallic container 1102 and moreover, at substantially the middle position of the height. There is hence a long creeping distance especially between the side wall 1103, in which the Peltier device is arranged, and the side wall 1103 located opposite the former side wall 1103, so that the temperature distribution within the portable cooler tends to become uneven.

Further, the upper edge of the metallic container 1102 extends to the opening of the heat-insulating container 1101 and moreover, the Peltier device 1105 is located near the upper edge. Whenever the heat-insulating cover 1108 is opened, the temperature of the top edge of the metallic container 1102 immediately rises. Even while the heat-insulating cover 108 is kept closed, there is still transfer of heat from between the heat-insulating container 1101 and the heat-insulating cover 1108. As a consequence, the cooling effects are reduced by these heat.

(Third problems)

In connection with the third related art, the quality of a food before defrosting, the defrosting speed, the defrost completion temperature and the defrosting method can be mentioned as elements which determine the quality of the food after defrosting. In freezing, the freezing speed gives more influence to the quality of a food than the freezing completion temperature. In defrosting, however, the defrost completion temperature gives greater influence to the quality of a good than the defrosting speed, because a deterioration in quality after defrosting proceeds in proportion to a rise in temperature and may proceed faster than fresh foods.

The conventional defrosting methods involve the drawback that, because the temperature of a defrosted food gradually rises due to the surrounding temperature when the food is left over subsequent to its defrosting, it is impossible to set a defrost completion temperature suited for the food or to retain the defrost completion temperature and the quality of the food is substantially deteriorated by defrosting.

Further, a conventional, especially household freezer freezes a food under fixed conditions without distinguishing, for example, an animal food and a vegetable food from each other. This often leads to broken cells and tissues of foods or to improper frozen state, so that the quality is reduced when defrosted.

In freezing, a food which is desired to be frozen ad has a high temperature is placed in a freezer compartment in which frozen foods have already been stored. This causes temperatures of the foods, which have been stored in a frozen state, rise locally, thereby possibly deteriorating the quality of the foods.

SUMMARY OF THE INVENTION

A first object of the present invention is to eliminate the above-described drawbacks of the first related art, and to provide a temperature-controlled appliance which is easy to use, permits processing of a great deal of foods in a short time as needed, and allows to set the temperature of each compartment at a constant level in a wide range as desired.

A second object of the present invention is to eliminate the above-described drawbacks of the second related art, and to provide a cold/warm storage appliance which can achieve a good thermal efficiency in cooling or heating and requires a lower running cost.

A third object of the present invention is to provide a cold/warm storage appliance convenient for use.

A fourth object of the present invention is to eliminate the above-described drawbacks of the third related art, and to provide a defrosting appliance, a freezer or a combined freezing-defrosting appliance which causes substantially no deterioration in the quality of a food or the like.

To achieve the above-described first object, the present invention provides, in a first aspect thereof, a temperature-controlled appliance provided with a plurality of mutually-independent temperature-controlled compartments arranged close to each other, characterized in that each of the compartments comprises:

a casing formed of a heat-insulating layer;

a thermal conductor arranged in the casing and provided with a heat-conducting surface located opposite a storage space in the casing;

a Peltier device thermally connected with the thermal conductor;

a power supply for feeding electric power to the Peltier device; and a controller for controlling electric power to be fed to the Peltier device so that a temperature in the casing is controlled.

To attain the above-described second object, the present invention also provides, in a second aspect thereof, a cold/warm storage appliance characterized in that the appliance comprises:

a heat-insulating casing opening in an end thereof;

a thermal conductor arranged inside the heat-insulating casing; and a Peltier device arranged on a rear side of a surface of the thermal conductor, said surface being located opposite an opening of the heat-insulating casing.

To fulfill the above-described third object, the present invention also provides, in a third aspect thereof, a cold/warm storage appliance according to the second aspect of the present invention, wherein the cold/warm storage appliance is arranged on an upper part of a wagon with the opening of the heat-insulating casing directed upward.

To accomplish the above-described fourth object, the present invention also provides, in a fourth aspect thereof, a defrosting appliance characterized in that the appliance comprises:

a casing formed of a heat-insulating layer;

a thermal conductor arranged in the casing and provided with a heat-conducting surface located opposite a storage space in the casing;

a Peltier device thermally connected with the thermal conductor;

a power supply for feeding electric power to the Peltier device; and a controller for controlling electric power to be fed to the Peltier device so that the storage space in the casing is controlled in a defrosting state.

To realize the above-described fourth object, the present invention also provides, a fifth aspect thereof, a freezer characterized in that the appliance comprises:

a casing formed of a heat-insulating layer;

a thermal conductor arranged in the casing and provided with a heat-conducting surface located opposite a storage space in the casing;

a Peltier device thermally connected with the thermal conductor;

a power supply for feeding electric power to the Peltier device; and a controller for controlling electric power to be fed to the Peltier device so that the storage space in the casing is controlled in a frozen state.

BRIEF DESCRIPTION OF THE DRAWINGS

FIG. 24 depicts simplified construction diagrams and temperature tables of chilled server basins employed in a test;

DETAILED DESCRIPTION OF THE INVENTION AND PREFERRED EMBODIMENTS

The temperature-controlled appliance according to the first embodiment of the present invention will hereinafter be described with reference to FIGS. 1 through 8.

The temperature-controlled appliance according to this embodiment is divided into a quick freezing compartment 1, a defrosting compartment 2, a frozen storage compartment 3 and a partial freezing compartment 4. The compartments 1–4 are independently and individually controlled in temperature. The compartments 1–4 are stacked in two stages and are integrally built in a cooling table 5, so that they are of the fixed type.

The quick freezing compartment 1 and the defrosting compartment 2 can be pulled out of the table 5 to facilitate cooling, whereas the frozen storage compartment 3 and the partial freezing compartment 4 are built in the table 5. The quick freezing compartment 1 and the defrosting compartment 2 are structurally the same, and so the frozen storage compartment 3 and the partial freezing compartment 4.

Figure 1:
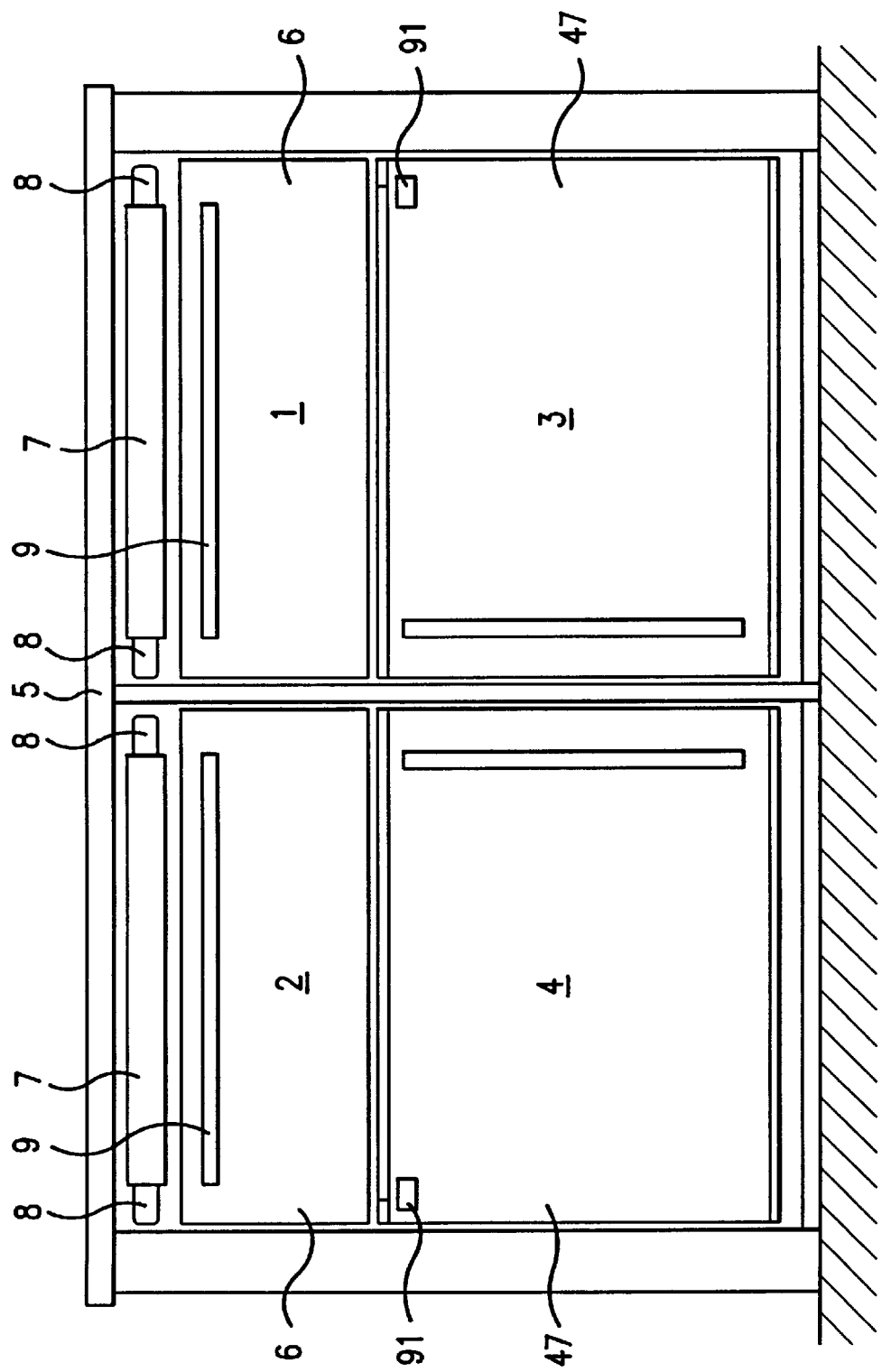
FIG. 1 is a front view of a temperature-controlled appliance according to a first embodiment of the present invention.
Figure 2:
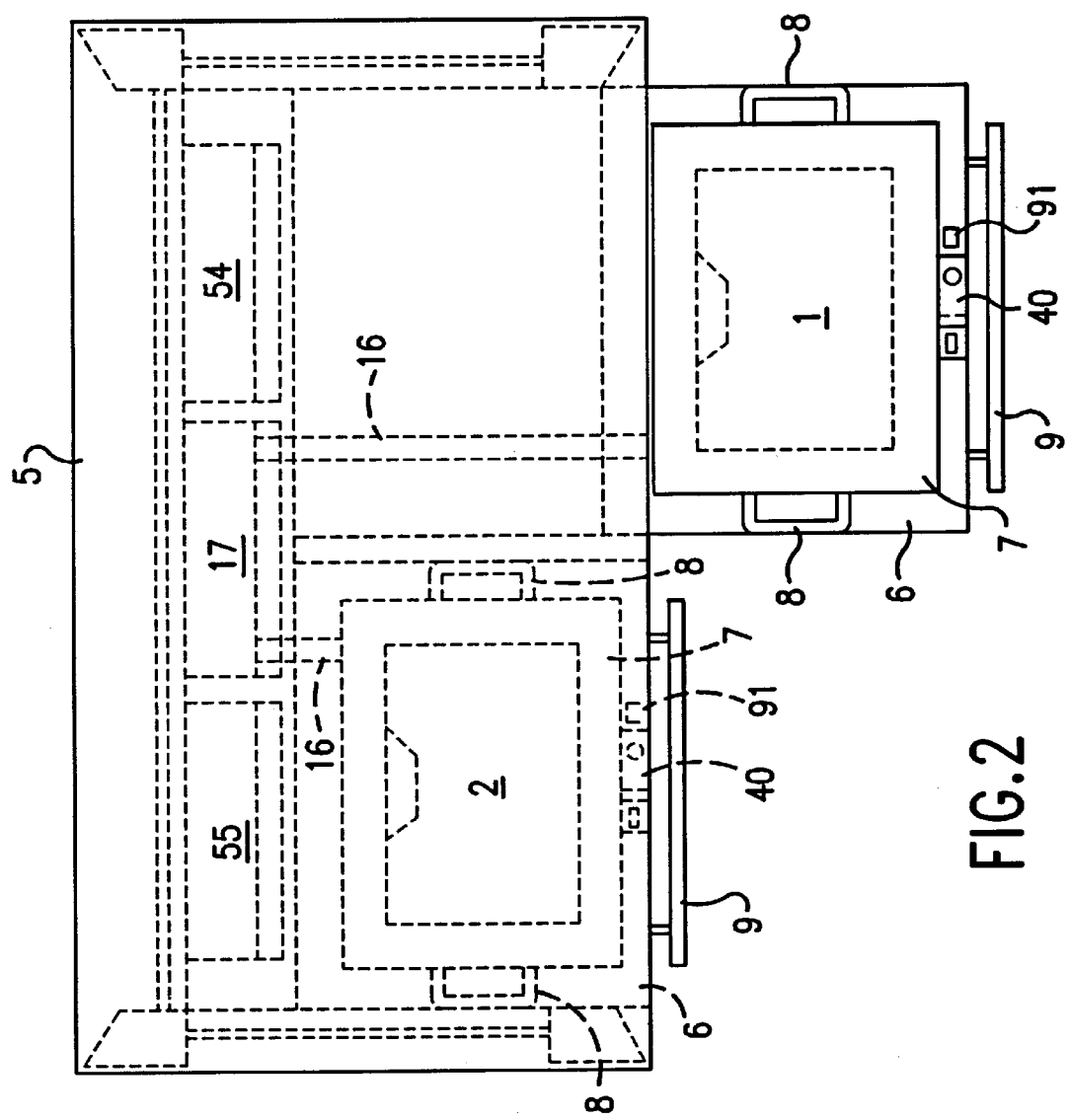
FIG. 2 is a plan view of the temperature-controlled appliance.
Figure 3:
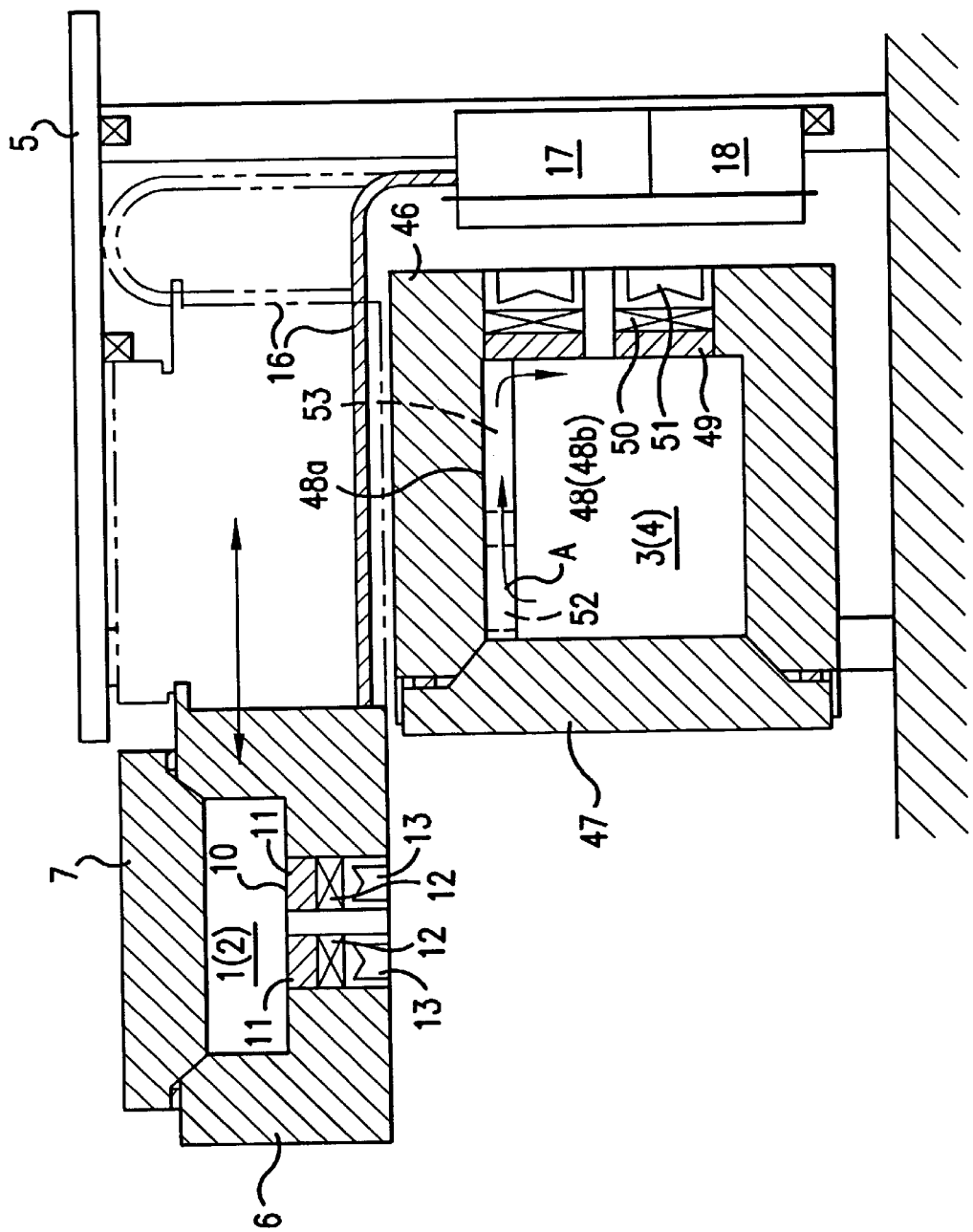
FIG. 3 is a cross-sectional side view of the temperature-controlled appliance.
Figure 4:
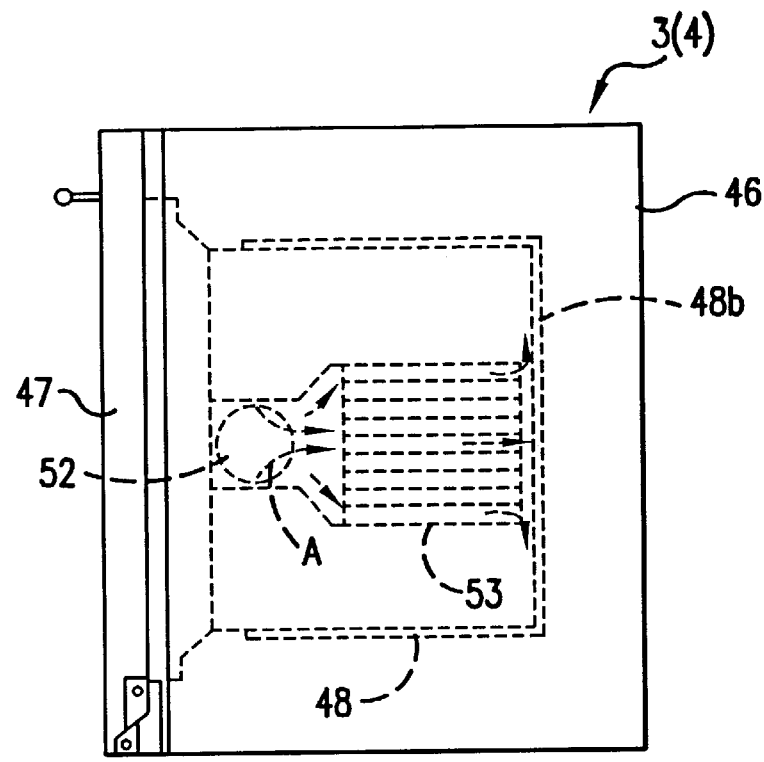
FIG. 4 is a plan view of a frozen storage compartment and a partial freezing compartment, both of which constitute the temperature-controlled appliance.
Figure 5:
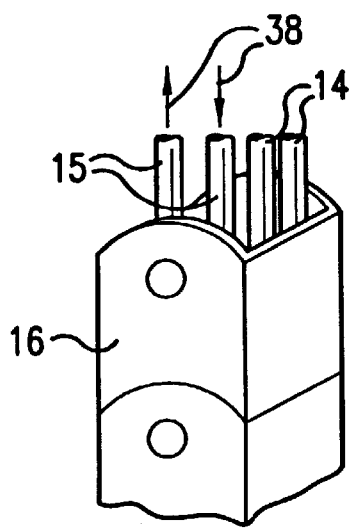
FIG. 5 is a partly-enlarged, perspective view of a cord/hose case used in the temperature-controlled appliance.

As is illustrated in FIG. 3, the quick freezing compartment 1 (the defrosting compartment 2) has a heat-insulating casing 6 in the form of a box opening upward and a heat-insulating cover 7 which openably closes up the opening. As is shown in FIGS. 1 and 2, the heat-insulating cover 7 are provided at opposite ends thereof with handles 8, and a handle 9 is arranged on a front wall of the heat-insulating casing 6.

As is also shown in FIG. 3, a first thermal conductor 10 made, for example, of aluminum or the like is arranged inside the heat-insulating casing 6. On a rear side of a bottom portion of the heat-insulating casing 6, a Peltier device 12 of the cascaded construction is arranged via a second thermal conductor 11 made, for example, of aluminum or the like in the form of plural blocks. Further, a circulation jacket 13 for a heat transfer medium is joined on an outer side of the second thermal conductor 11. Feed cords 14 connected to the Peltier device 12 and hoses 15 connected to the circulation jacket 13 are received in an elongated, flexible cord/hose case 16 and are connected to a second heat-dissipating unit 17 (see FIGS. 2 and 3).

In a state where the freezing compartment 1 (the defrosting compartment 2) has been pulled out of the cooling table 5 as shown in FIG. 3, the cord/hose case 16 extends as indicated by solid lines. When the freezing compartment 1 (the defrosting compartment 2) is pushed in, the cord/hose case 16 is accommodated in a bent form behind the freezing compartment 1 (the defrosting compartment 2) as indicated by two-dot chain lines. The feed cords 14 are connected to a power supply controller 18 which is arranged neat the second heat-dissipating unit 17 (see FIG. 3).

In this embodiment, the storage capacities of the freezing compartment 1 and the defrosting compartment 2 are each 7 liters, while those of the frozen storage compartment 3 and the partial freezing compartment 4 are each 30 liters. Since the freezing compartment 1 and the defrosting compartment 2 are smaller in storage capacity than the frozen storage compartment 3 and the partial freezing compartment 4, the hoses 15 of both the compartments 1,2 are connected to the second heat-dissipating unit 17, in other words, both the compartments 1,2 commonly use the same heat-dissipating unit. However, each compartment is provided with its own power supply controller 18.

Figure 6:
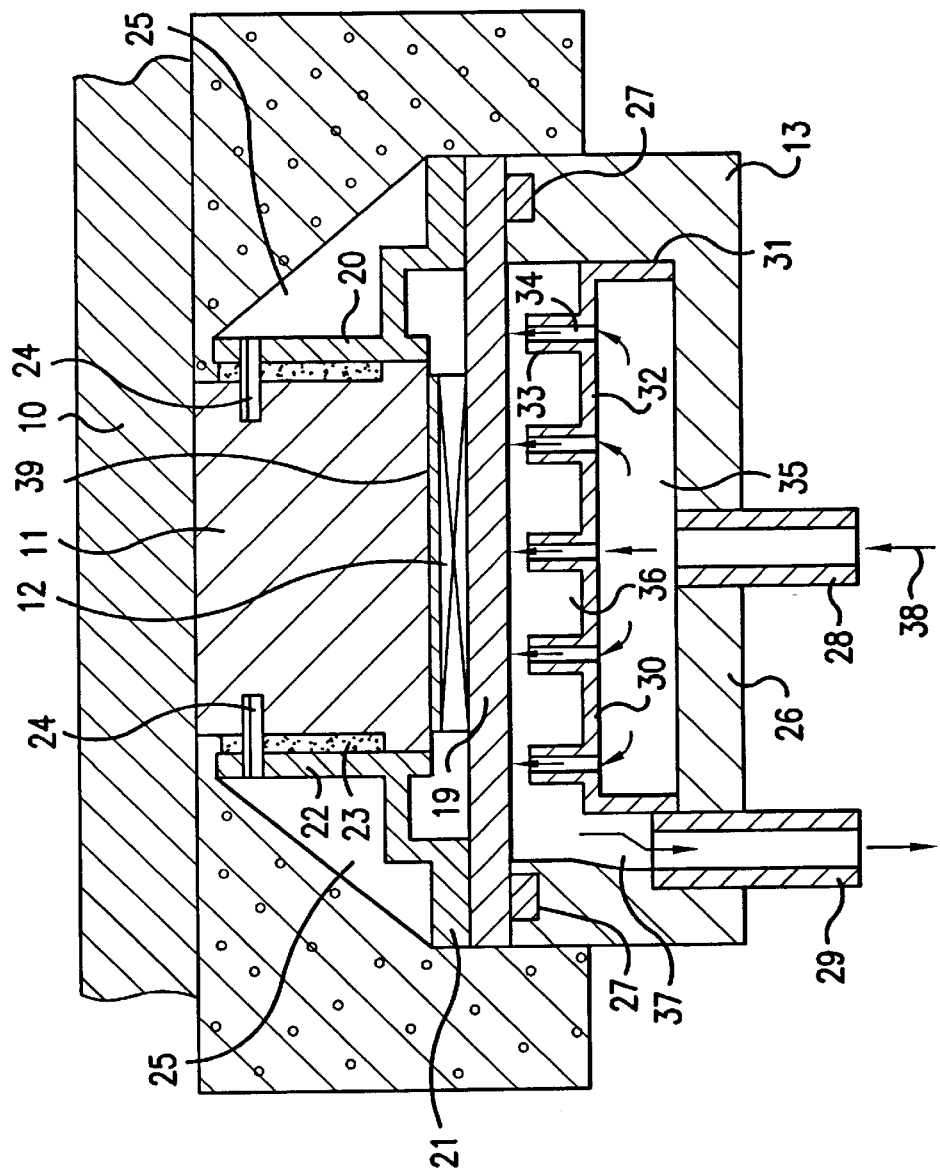
FIG. 6 is an enlarged cross-sectional view of a circulation jacket for a heat transfer medium, which is used in the temperature-controlled appliance.
Figure 7:
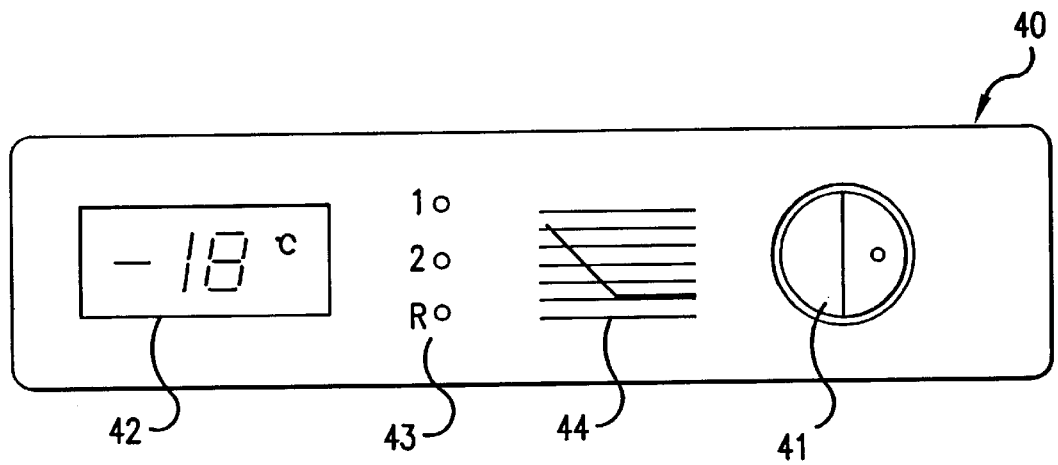
FIG. 7 is an enlarged plan view of a control panel arranged in a quick freezing compartment of the temperature-controlled appliance.

FIG. 6 illustrates in detail the structure around the circulation jacket 13 for the heat transfer medium. This circulation jacket 13 has a plate-shaped heat-exchanging base 19 joined to a heat-dissipating side of the Peltier device 12. From a peripheral portion of the heat-exchanging base 19, a first frame 20 extends toward the second thermal conductor 11. The first frame 20 is a hollow shape which opens at upper and lower parts thereof, has a basal end portion 21 and an extended portion 22 extending upwards from the basal end portion 21, and has a substantially stepped cross-sectional shape. The basal end portion 21 is joined in a liquid-tight fashion to a peripheral part of an upper surface of the heat-exchanging base 19 by using, for example, an adhesive or an O-ring and an adhesive in combination.

As is shown in the drawing, the extended portion 22 is located in parallel with and opposite a peripheral wall of the second thermal conductor 11 with an adhesive 23 poured therebetween so that the second conductor 11 and the first frame 20 are integrally joined together. As the adhesive 23, a hardening adhesive such as an epoxy adhesive or an acrylic adhesive or a fusion-bonding adhesive such as a hot melt adhesive can be applied, for example.

Plural positioning pins 24 extend across the peripheral wall of the second thermal conductor 11 and the extended portion 22 to prevent any relative positional displacement between the second thermal conductor 11 and the first frame 20 before the adhesive 23 hardens completely. The extended portion 22 is provided on an outer side thereof with plural reinforcing ribs 25 which extend toward the basal end portion 21, whereby the first frame 20 is allowed to remain rigid.

Further, the stepwise, in other words, nonlinear configuration between the basal end portion 21 and the extended portion 22 surely provides the first frame 20 with a longer creeping distance from the second thermal the basal end portion 21 to the heat-exchanging base 19, thereby reducing a quantity of heat to be returned through the first frame 20.

On a peripheral part of a lower side of the heat-exchanging base 19, a second frame 26 having a hollow shape which is substantially closed at a lower part thereof but is open at an upper part thereof is bonded in a liquid-tight fashion with an O-ring 27 interposed therebetween. The second frame 26 is provided at a approximately central part thereof with a supply pipe 28 and near a peripheral edge thereof with a drain pipe 29.

A distributing member 30, which is arranged in the hollow space of the second frame 26, is provided with an upper wall 32 disposed in continuation to an upper edge of the peripheral wall 31 and also with a number of nozzle portions 33 extending form the upper wall 32 toward the heat-exchanging base 19. Through the nozzle portions 33, distributing holes are formed, respectively.

By fixing the distributing member 30 within the second frame 26, a flattened first space 35 is formed on a side of the supply pipe 28 relative to the distributing member 30 and a flattened second space 36 is formed on a side of the heat-exchanging base 19 relative to the distributing member 30. Further, a drain channel 37 is formed communicating the second space 36 with the drain pipe 29.

As is depicted in the drawing, when the heat transfer medium 38 formed of purified water, antifreeze or the like (purified water is used in this embodiment) is supplied through the central supply pipe 28, it immediately spreads out in the first space 35 and vigorously jets out from the individual nozzle portion 33 (distributing holes 34) toward the lower side of the heat-exchanging base 19 in substantially a perpendicular direction. The heat transfer medium 38 hits the heat-exchanging base 19 and absorbs heat therefrom. It then promptly spreads out in the narrow second space 36 and flows out of the system through the drain channel 37 and the drain pipe 29. The thus-drained heat transfer medium 38 flows though the hoses 15 shown in FIG. 5. It is subjected to forced cooling in a radiator (not show) arranged in the second heat-dissipating unit 17 illustrated in FIG. 3 and is then supplied again to the circulation jacket 23 by an unillustrated pump. In FIG. 6, numeral 39 indicates a thin film which is interposed between the second thermal conductor 11 and the Peltier device 12 and is made of a material having good thermal conductivity and elasticity, for example, a gel-like silicone resin.

As is shown in FIG. 2, the control panel 40 is arranged near the handle 9 of the quick freezing compartment 1. As is illustrated in detail in FIG. 7, the control panel 40 is provided with a power switch 41, a preset temperature indicator 42 for showing a preset temperature by numerical figures at a liquid crystal display, a step-up indicator 43 for showing stepwise (in three stages in this embodiment) a period from turning-on of the power switch 41 until exhibition of freezing function by turning on lamps, and a freezing pattern indicator 44 for showing that the interior temperature drops with time by the freezing function and remains constant after it reaches a preset freezing temperature (−18° C. in this embodiment).

Figure 8:
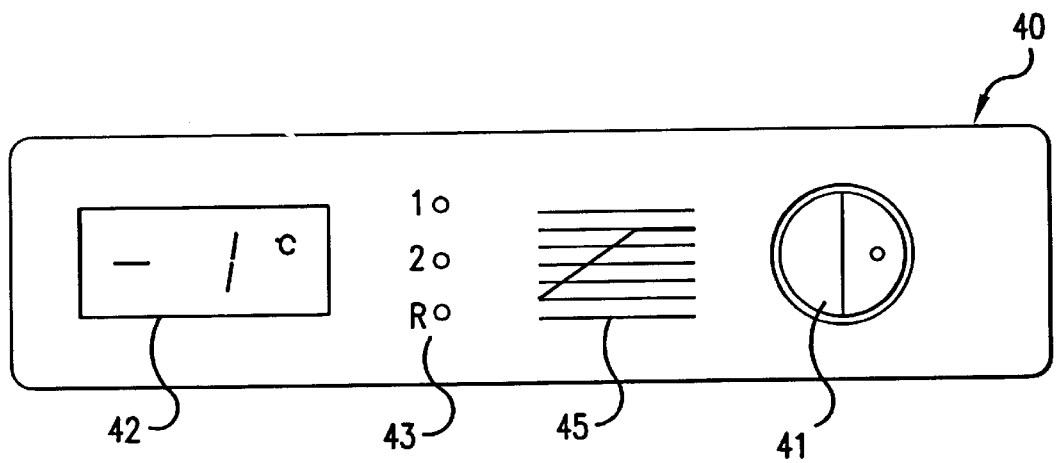
FIG. 8 is an enlarged plan view of a control panel arranged in a defrosting compartment of the temperature-controlled appliance.

As is also shown in FIG. 2, the defrosting chamber 2 is also provided with a control panel 40. This control panel 40 is different from that of the quick freezing compartment 1 in that, as is illustrated in FIG. 8, a defrosting pattern indicator 45 is arranged to show that the interior temperature rises with time by the defrosting function and remains constant when it reaches a preset defrosting temperature (−1° C. in this embodiment).

The frozen storage compartment 3 (the partial freezing compartment 4) has a heat-insulating casing 46 in the form of a box which is open through a front wall. A heat-insulating door 47 is arranged to openably close the opening in the front wall. In close contact with an inner wall of the heat-insulating casing 46, a container-shaped first thermal conductor 48 is arranged. A block-shaped second thermal conductor 49 is disposed on a rear side of a substantially central part of a wall portion of the first thermal conductor 48, said wall portion being located opposite the opening, in other words, an end wall portion of the first thermal conductor 48. On a rear side of the second thermal conductor 49, a circulation jacket 51 for the heat transfer medium is arranged via a Peltier device 50 of the cascaded construction. The construction and function of the circulation jacket 51 for the heat transfer medium are similar to those described above with reference to FIG. 6, and their description is therefore omitted herein.

To cause air A, which exists inside the frozen storage compartment 3 (the partial compartment 4), to flow along an upper peripheral wall 48a of the first thermal conductor 48, to hit an end wall 48b in which the Peltier device to is arranged and then to flow down along the end wall 48b as indicated by arrows in FIG. 3, the upper peripheral wall 48a is provided with an interior fan 52 and a number of heat-absorbing fins 53 having guide grooves extending in parallel with each other. In addition, the upper peripheral wall 48 and the end wall 48b are slightly thinner than the remaining walls of the first thermal conductor 48.

In FIG. 2, numeral 54 indicates a first heat-dissipating unit connected to a circulation jacket (not shown) for heat transfer medium of the frozen storage compartment 3, and numeral 55 indicates a second heat-dissipating unit connected to a circulation jacket (not shown) for heat transfer medium of the partial freezing compartment 4.

Although the heat-controlled appliance is basically divided depending on the functions for use, namely, into the quick freezing compartment 1, the defrosting compartment 2, the frozen storage compartment 4 and the partial freezing compartment 4, the compartments 1–4 can each be temperature-controlled in a range from a low temperature permitting freezing of foods or the like to a high temperature allowing maturing or warm storage of foods or the like, namely, in a wide temperature range of from −30° C. to +50° C.

Accordingly, the compartments 1–4 can each be set, for example, at the following temperatures depending on the purposes of use. Namely, each compartment can be applied for various purposes.

| Illustrative purposes of use | Setting temperature (° C.) |
| --- | --- |
| (1) Long-term storage of frozen foods | −23 |
| (2) General storage under freezing | −18 |
| (3) Storage of live fish and raw fish | −0.5 |
| (4) Storage of beer and chilled sake | 7 |
| (5) Storage of white wine | 14 |
| (6) Storage of red wine | 20 |
| (7) Maturing of cooking ingredients | 40–50 |

If it is desired, for example, to freeze a large quantity of foods at once, the defrosting compartment 2 can also be used as a quick freezing compartment (namely, by setting electric power, which is fed to the Peltier device 12 of the defrosting compartment 2, in the same manner as electric power to be fed to the quick freezing compartment 1). Freezing can therefore be conducted using the quick freezing compartments of a capacity (14 liters) twice as great as the quick freezing compartment 1. The quickly-frozen foods can then be successively placed and stored in the frozen storage compartment 3. If it is desired to defrost a large quantity of frozen foods at once, the quick freezing compartment 1 can be used as a defrosting compartment, thereby making it possible to form defrosting compartments of a capacity (14 liters) twice as great as the defrosting compartment 2. Moreover, the partial freezing compartment 4 can also be used for freezing or defrosting as needed.

If it is desired to store a large quantity of foods or cooking ingredients under refrigeration, for example, in preparation for a party, the quick freezing compartment 1, the defrosting compartment 2, the frozen storage compartment 3 and the partial freezing compartment 4 can be used in combination as needed. In this embodiment, it is therefore possible to change the refrigeration capacity as follows:

| Refrigeration capacity (liters) | Used compartment(s) |
| --- | --- |
| 30 | Partial freezing compartment 4 alone |
| 37 | Partial freezing compartment 4 + Quick freezing compartment 1 |
| 44 | Partial freezing compartment 4 + Quick freezing compartment 1 + Defrosting compartment 2 |
| 60 | Partial freezing compartment 4 + Frozen storage compartment 3 |
| 67 | Partial freezing compartment 4 + Frozen storage compartment 3 + Quick freezing compartment 1 |
| 70 | Partial freezing compartment 4 + Frozen storage compartment 3 + Quick freezing compartment 1 + Defrosting compartment 2 |

These combinations are not limited to refrigeration but can also be applied likewise for warm storage, maturing and the like. In such applications, however, it is necessary to reverse the direction of a current to be fed to each Peltier device.

Referring next to FIGS. 9 through 15, the temperature-controlled appliance according to the second embodiment will be described.

Figure 9:
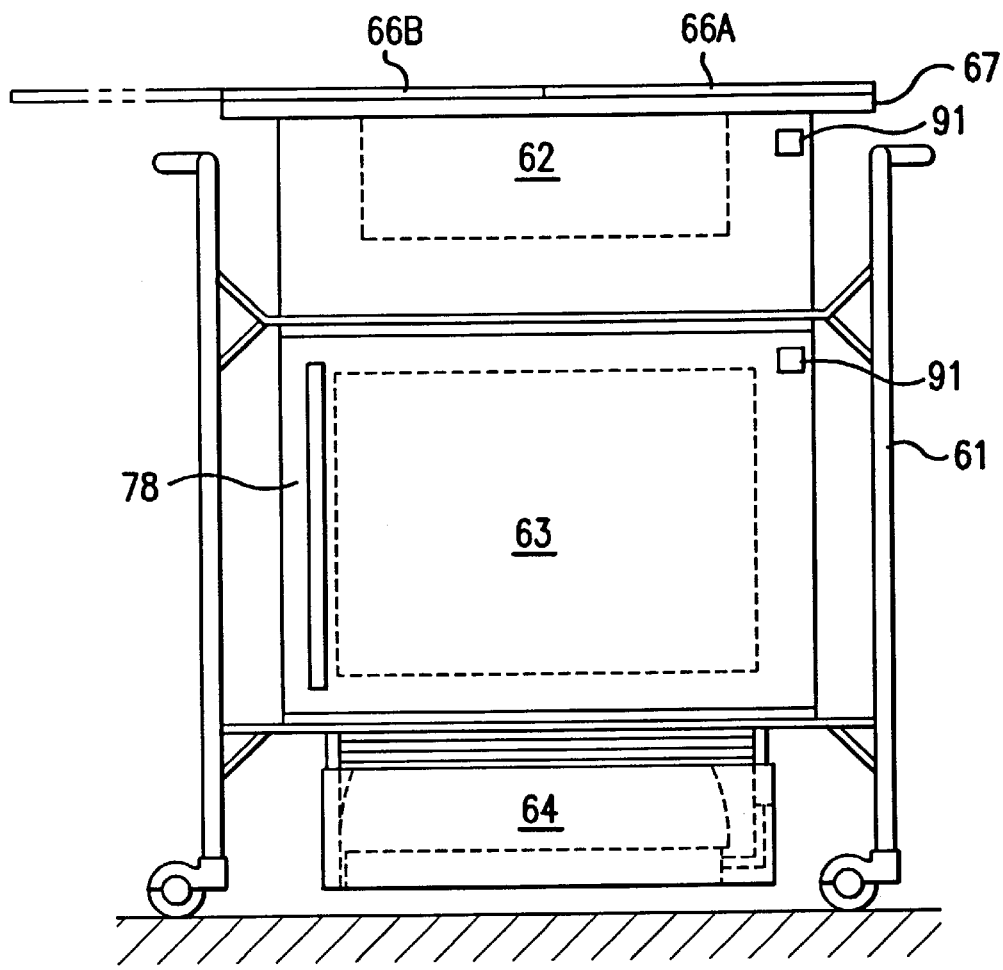
FIG. 9 is a front view of a temperature-controlled appliance according to a second embodiment of the present invention.

As is illustrated in FIG. 9, this temperature-controlled appliance is constructed primarily of a chilled server basin 62 mounted in an upper part of a wagon 61 equipped with casters at four corners thereof, a refrigerator 63 mounted in a middle part of the wagon 61, and a heat-dissipating radiator 64 attached in a lower part of the wagon 61. The temperature-controlled appliance can therefore be moved freely to a desired place (for example, to a place near a cooking table or a dining table).

Figure 11:
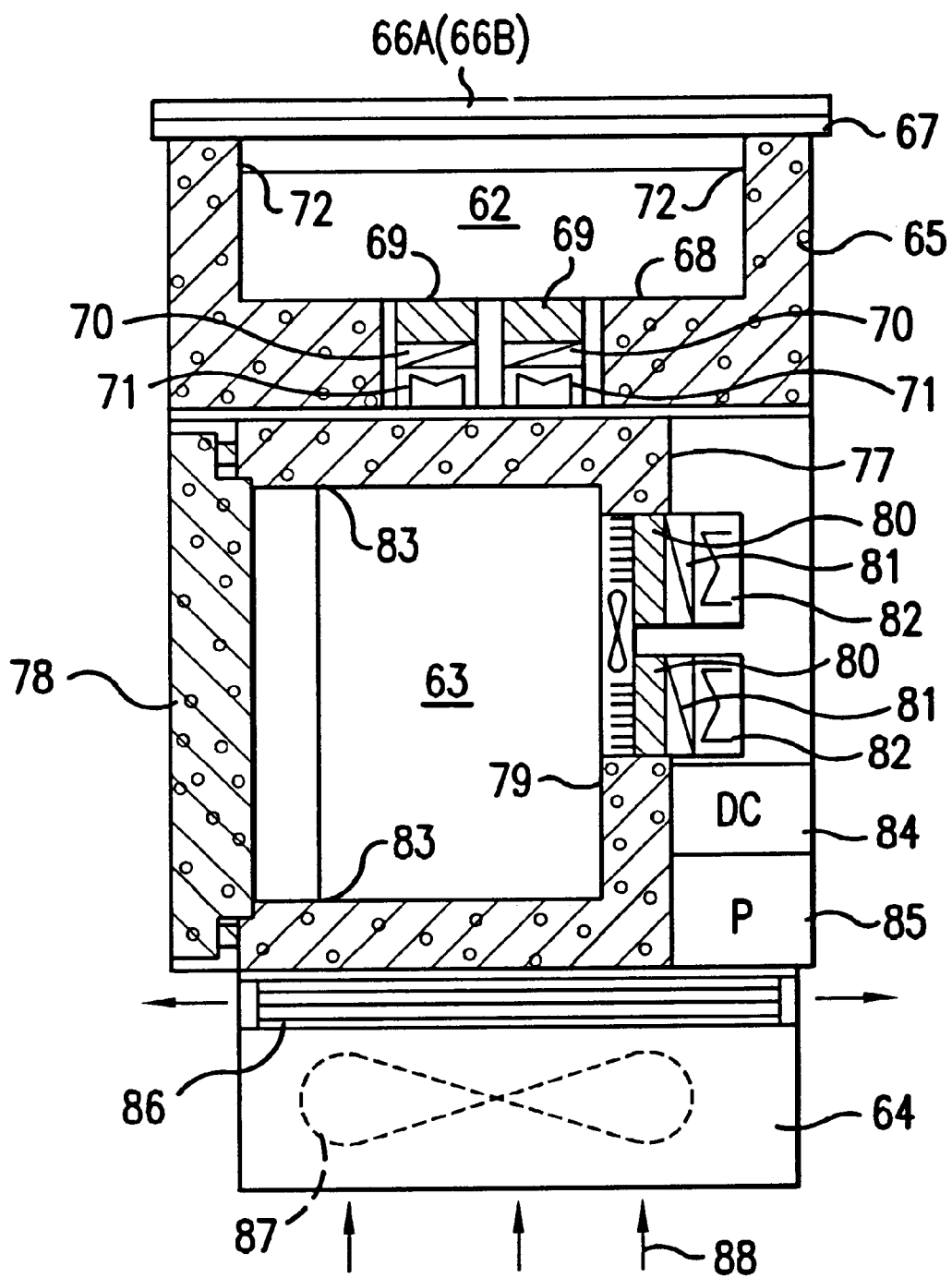
FIG. 11 is a cross-sectional side view of the temperature-controlled appliance.
Figure 13:
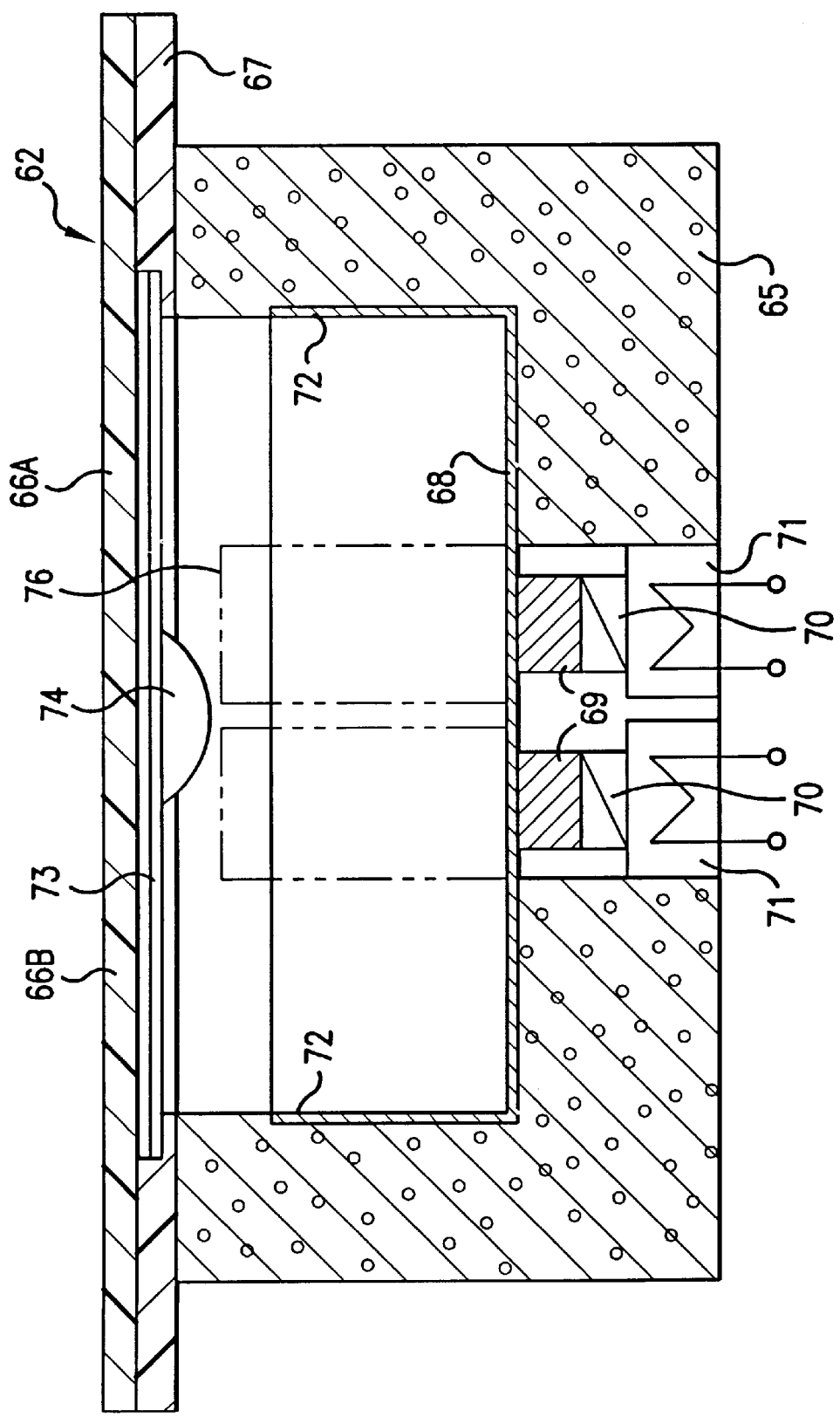
FIG. 13 is an enlarged cross-sectional view of a chilled server basin of the temperature-controlled appliance.

The chilled server basin 62 has a heat-insulating casing 65, which is in the form of a box open at an upper part thereof as shown in FIGS. 11 and 13 and is made, for example, of an expanded polyurethane resin or the like. To openably close up the upper opening of the casing, two sliding top covers 66A,66B are slidably supported on a frame-shaped support member 67 attached to the opening of the heat-insulating casing 65.

In close contact with an inner wall of the heat-insulating casing 65, a container-shaped first thermal conductor 68 is arranged. A plurality of block-shaped second thermal conductors 69 are disposed on a rear side of a substantially central part of a wall portion of the first thermal conductor 68, said wall portion being located opposite the opening of the heat-insulating casing 65, in other words, a bottom portion of the first thermal conductor 68. In close contact with a lower side of the second thermal conductor 69, a circulation jacket 71 for heat transfer medium is arranged via a Peltier device 70 of the cascaded construction.

In this embodiment, the first thermal conductor 68 in the form of a container having four peripheral walls is used. As an alternative, a first thermal conductor having, for example, an L-shaped or inverted square U-shaped configuration in a side view can also be used.

In this embodiment, the first thermal conductor 68 and the second thermal conductor 69 are discrete members. They cay be integrated, or the second thermal conductor 69 can be omitted.

The construction around the circulation jacket 71 for the heat transfer medium is the same as that illustrated in FIG. 1, so that its description is omitted herein.

To form the first thermal conductor 68, a container is constructed using an aluminum plate. An edge 72 of its opening does not extend to the opening of the heat-insulating casing 65 and terminates at an intermediate height. An end face of the edge 72 of the opening is covered by a part of a peripheral wall of the heat-insulating casing 65. The percentage of the height (depth) of the peripheral wall of the first thermal conductor 68 based on the height (depth) of the heat-insulating casing 65 may suitably range from 50 to 95%, and is 70% in this embodiment.

Figure 14:
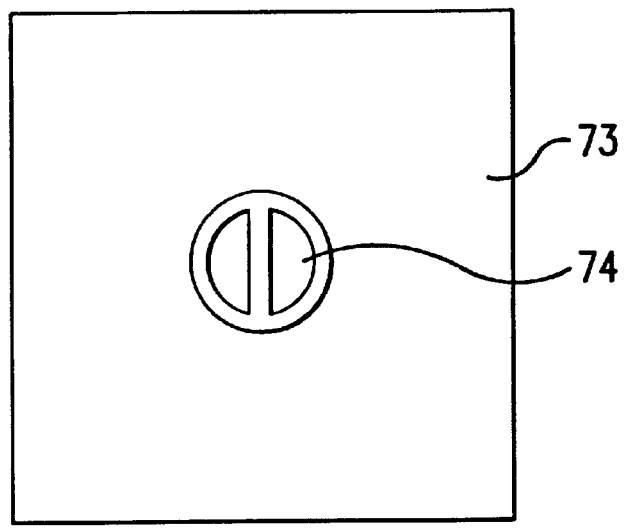
FIG. 14 is a plan view of an inner cover for use in the chilled server basin.

As is shown in FIG. 13, a light-weight inner cover 73 is detachably arranged between the opening of the heat-insulating casing 65 and the sliding top covers 66A,66B. The inner cover 73 is formed of a transparent plate of a polyacrylic resin or the like as depicted in FIG. 14, and is provided at a central part thereof with a finger grip 74. As is illustrated in FIGS. 10 and 12, finger grips 75 are also formed on in the upper surfaces of the sliding top covers 66A,66B, respectively.

Figure 10:
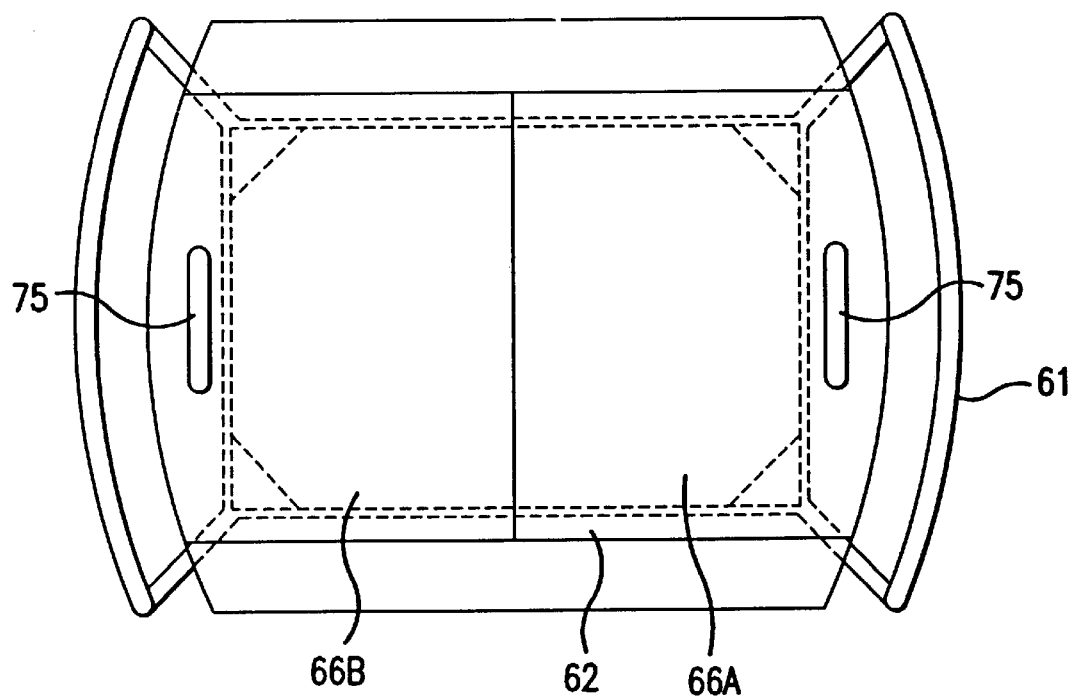
FIG. 10 is a plan view of the temperature-controlled appliance.
Figure 12:
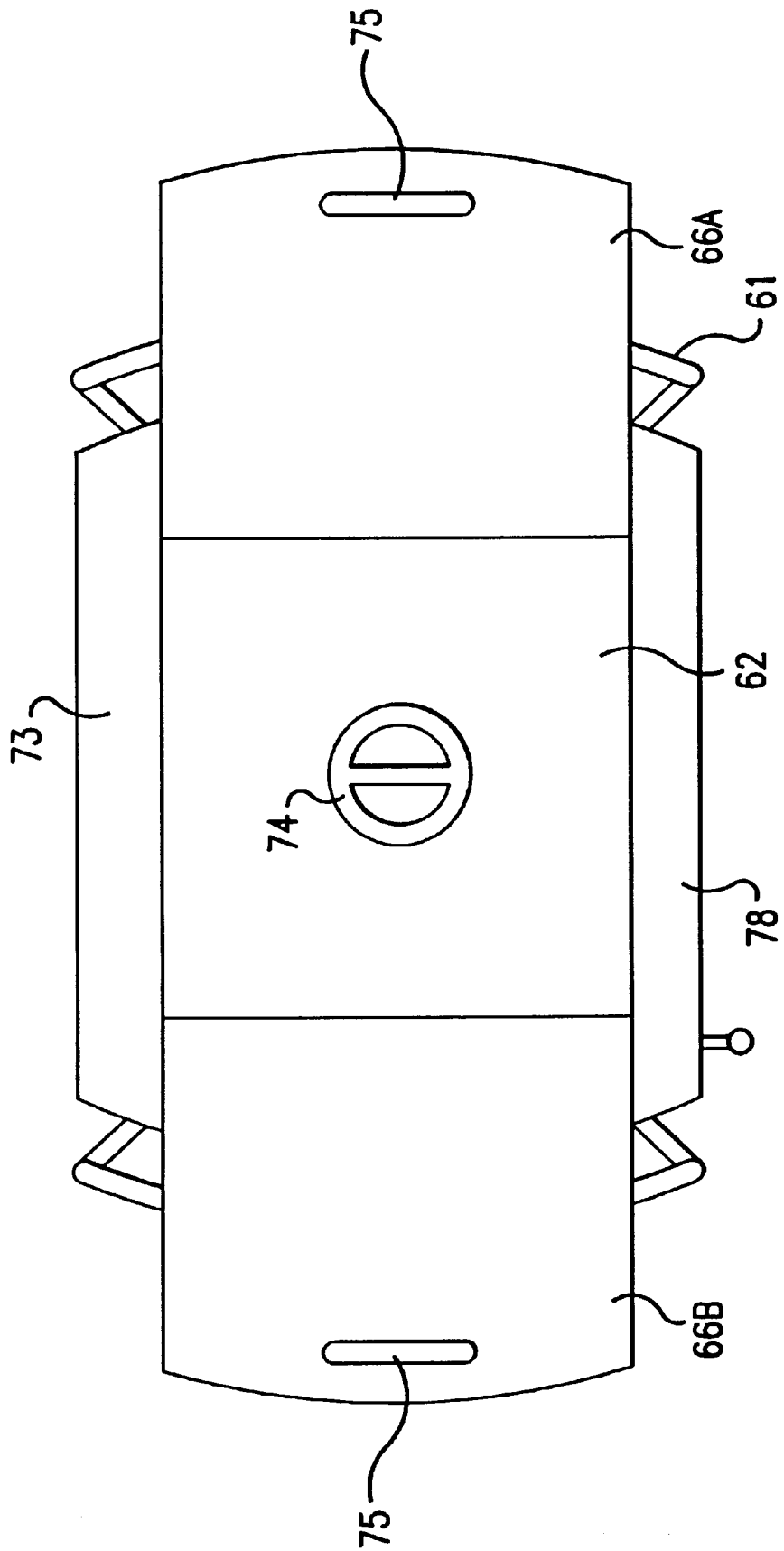
FIG. 12 is a plan view of the temperature-controlled appliance with sliding top covers thereof opened.

FIG. 10 shows the sliding top covers 66A,66B in closed positions, while FIG. 12 depicts the sliding top covers 66A,66B in open positions. As the sliding top covers 66A, 66B can be opened, chilled foods and beverages stored in the chilled server basin 62, such as desserts and fruits, can be seen through the inner cover 73 (see FIG. 13). The adoption of the double-wall structure formed of the sliding top cover 66A,66B and the inner cover 73 can provide high chilling effects.

If the sliding top covers 66A,66B are opened, the inner cover 73 is removed, and a cooked food to stored in a chilled state, said food being placed on a plate or in a bowl, is placed in the chilled server basin 62, the cooked food can be served in a chilled state. At that time, the sliding top covers 66A,66B can be used as tables.

The arrangement of the Peltier device 70 in the bottom portion of the first thermal conductor 68 as in this embodiment can provide very high cooling effects because, when the chilled foods and beverages 76 are placed in the heat-insulating casing 65, the chilled foods and beverages 76 are naturally brought into direct contact with the bottom portion of the first thermal conductor 68 and can be chilled by the Peltier device 70 through the bottom portion.

As is illustrated in FIG. 11, the refrigerator 63 has a heat-insulating casing 77 which is open through a front wall thereof, and is provided with a heat-insulating door 78 which openably closes up the opening. In close contact with an inner wall of the heat-insulating casing 77, a container-shaped first thermal conductor 79 is arranged. Block-shaped, finned second thermal conductors 80 are disposed on a rear side of a substantially central part of a wall portion of the first thermal conductor 79, said wall portion being located opposite the opening, in other words, an end wall of the first thermal conductor 79. In close contact with rear sides of the second thermal conductor 80, a circulation jacket 82 for heat transfer medium is arranged via a Peltier device 81 of the cascaded construction. The construction and function of the circulation jacket 82 for the heat transfer medium are similar to those described above with reference to FIG. 6, so that their description is omitted herein.

To form the first thermal conductor 69, a container is constructed using an aluminum plate. An edge 83 of its opening does not extend to the opening of the heat-insulating casing 77 and terminates at an intermediate height. An end face of the edge 83 of the opening is covered by a part of a peripheral wall of the heat-insulating casing 77.

Behind the heat-insulating casing 77, there are arranged a D.C. power supply (a primary battery or a secondary battery) 84, which includes a controller for actuating the Peltier devices 70,81, and a pump 85 for feeding the heat transfer medium (purified water in this embodiment) into the circulation jackets 71,82 for the heat transfer medium.

The heat-dissipating radiator 64 is provided with heat-dissipating fins 86 and a heat-dissipating fan 87, whereby the heat transfer medium fed through the circulation jackets 71,82 for the heat transfer medium is forcedly cooled by air 88. Although not illustrated in the drawing, the circulation jackets 71,82 for the heat transfer medium are connected in series via a hose.

In this embodiment, the storage capacity of the chilled server basin 62 is 5 liters and that of the refrigerator 63 is 30 liters. The chilled server basin 62 and the refrigerator 63 can both be used as chilled server basins, refrigerators, or warm server basins.

Figure 15:
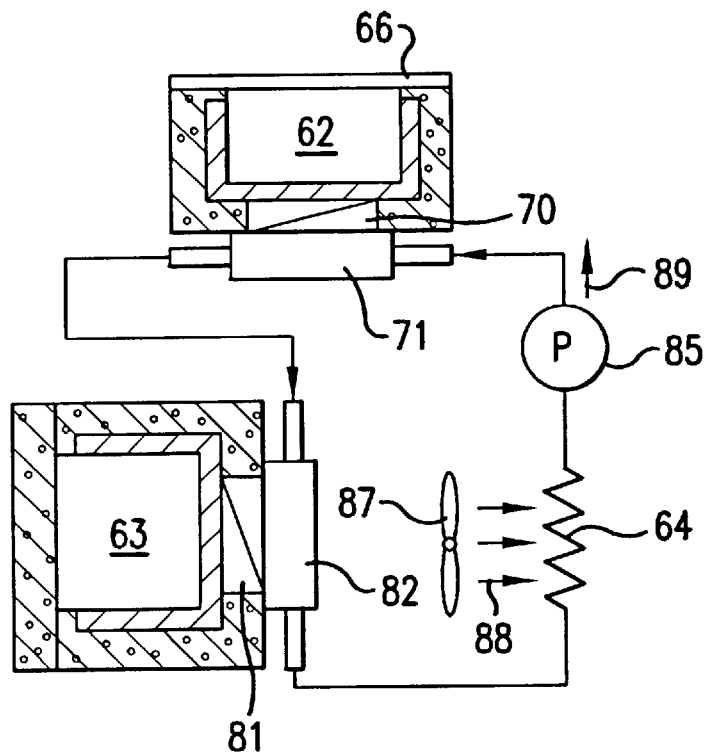
FIG. 15 is a simplified construction diagram showing a flow of a heat transfer medium in the temperature-controlled appliance.

A flow of the heat transfer medium 89 through the temperature-controlled appliance is illustrated in the schematic construction diagram of FIG. 15. As is shown in the diagram, the heat transfer medium 89 delivered under a predetermined pressure from the pump 85 is first sent to the circulation jacket 71 for the heat transfer medium of the chilled server basin 62 the chilling temperature of which is low, thereby contributing to the absorption of heat from the Peltier device 70. The heat transfer medium 89 is next sent to the circulation jacket 82 for the heat transfer medium of the refrigerator 63, and contributes to the absorption of heat from the Peltier device 81. The heat transfer medium 89, the temperature of which has arisen owing to its passage through the circulation jackets 71,82, is then cooled by air 88 at the heat-dissipating radiator 64 and is again used for the absorption of heat from the Peltier devices 70,81.

In this embodiment, the cooled heat transfer medium 89 is sent first to the chilled server basin 62. If the refrigerator 63 is subjected to greater chilling load than the chilled server basin 62, the heat transfer medium 89 is first sent to the refrigerator 63.

Figure 16:
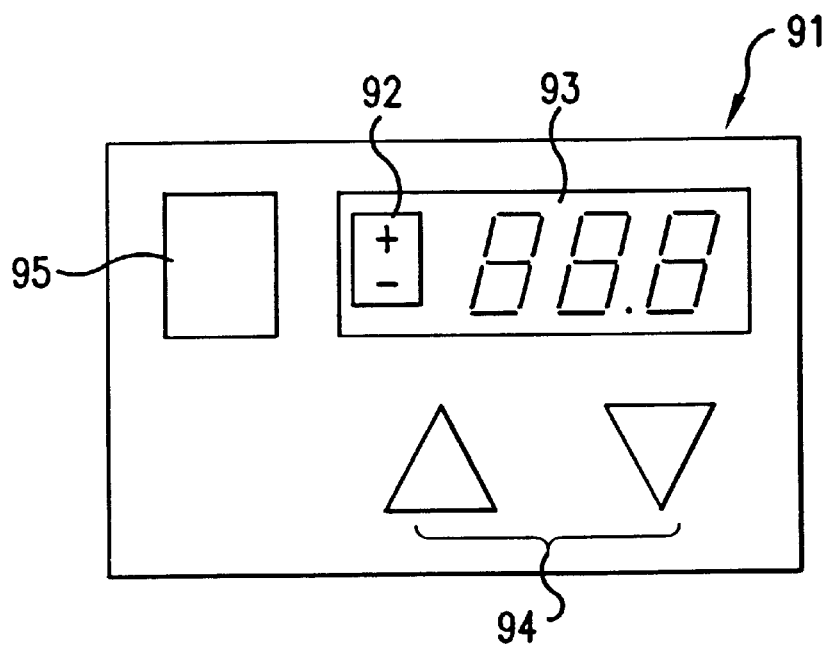
FIG. 16 is a enlarged plan view of a temperature setting panel of each of the temperature-controlled appliances according to the first and second embodiments.

Referring now to the plan view of FIG. 16, a temperature setting panel 91 applied to the first and second embodiments is illustrated. The panel 91 is provided with a ± key 92 which is turned to minus (−) when pushed twice, a temperature indicator 93 in the form of a liquid crystal display, an up-down key 94 for adjusting a temperature to be set, and a setting key 95 for recording final setting of a temperature.

The quick freezing compartment 1, the defrosting compartment 2, the frozen storage compartment 3, the partial freezing compartment, the chilled server basin 62 and the refrigerator 63 are each provided with its own temperature setting panel 91 as shown in FIGS. 1, 2 and 9. Depending on an application purpose, a temperature can be independently set in a wide temperature range of from −30° C. to 50° C.

Figure 17:
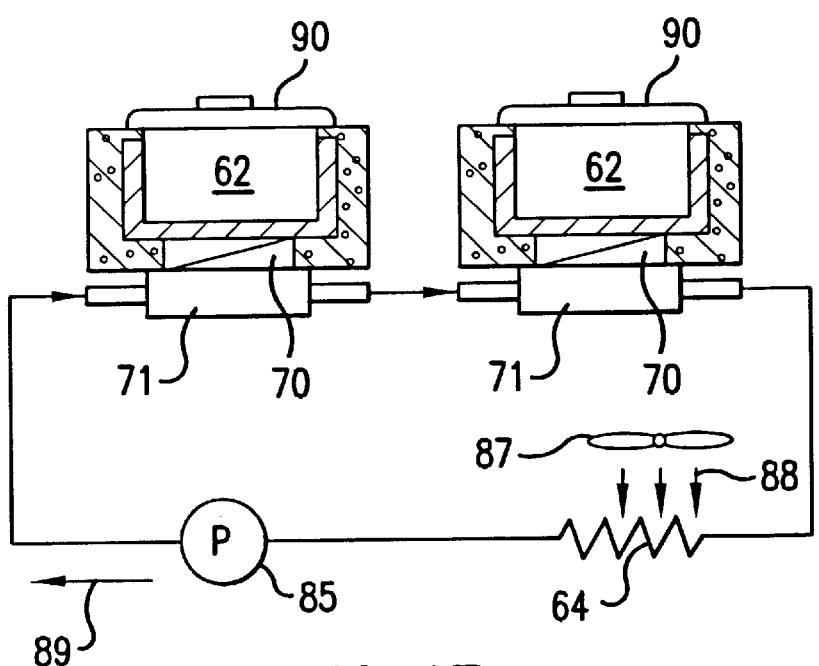
FIG. 17 is a simplified construction diagram of a thermoelectric refrigerator according to a third embodiment of the present invention.

FIG. 17 illustrates the third embodiment, and shows by way of example plural chilled server basins 62 arranged on a cooking table and connected by a single circulation system. Incidentally, numeral 90 indicates covers.

Figure 18:
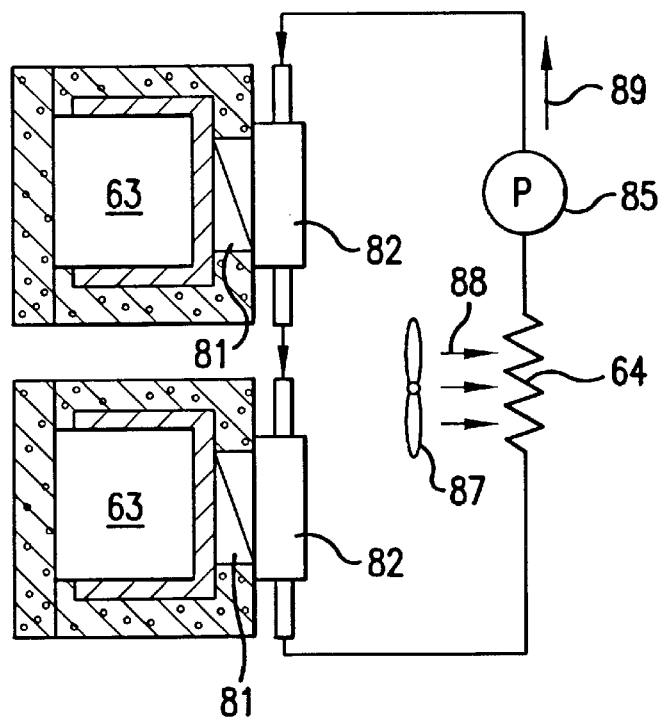
FIG. 18 is a simplified construction diagram of a thermoelectric refrigerator according to a fourth embodiment of the present invention.

FIG. 18 shows the fourth embodiment, and depicts by way of example plural refrigerators 63 arranged in an up-and-down or side-by-side relationship and connected by a single circulation system.

Figure 19:
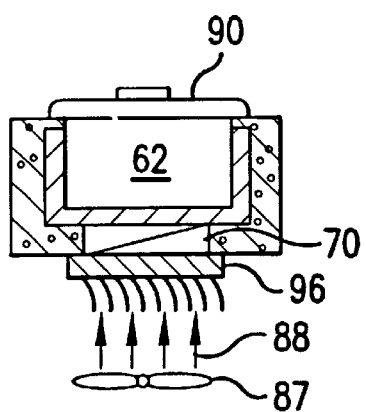
FIG. 19 is a simplified construction diagram of a thermoelectric refrigerator according to a fifth embodiment of the present invention.

FIG. 19 depicts the fifth embodiment in which, instead of using a cooling system by the heat transfer medium 89, heat-dissipating fins 96 are connected directly to a heat-dissipating side of a Peltier device 70 and are cooled by air 88. This construction is suited for a small chilled server basin or warm server basin.

Figure 20:
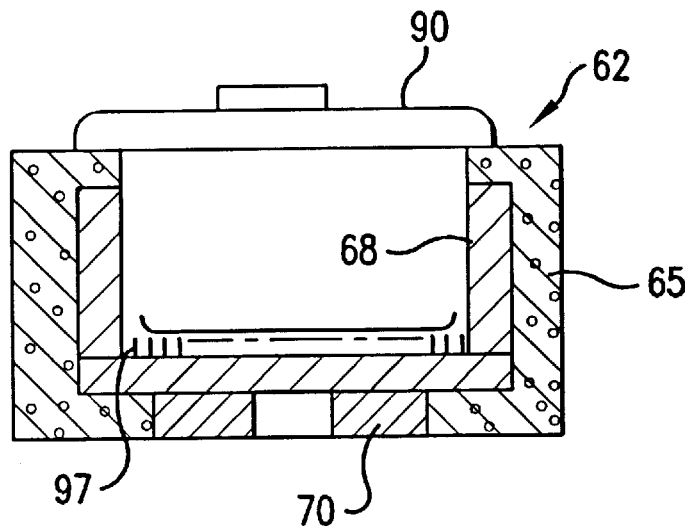
FIG. 20 is a simplified construction diagram of a thermoelectric refrigerator according to a sixth embodiment of the present invention.

FIG. 20 illustrates the sixth embodiment. Heat-absorbing fins 97 are integrally arranged on an inner surface of a bottom portion of a first thermal conductor 68 which is in the form of a container. A cooking pan 98 or the like is mounted on the heat-absorbing fins 97. In this embodiment, the heat-absorbing fins 97 are arranged on the side of the first thermal conductor 68. As an alternative, instead of the arrangement of the heat-absorbing fins 97 on the inner surface of the bottom portion of the third thermal conductor 68, heat-dissipating fins can be arranged on a bottom wall of the metal-made cooking pan 98.

Figure 21:
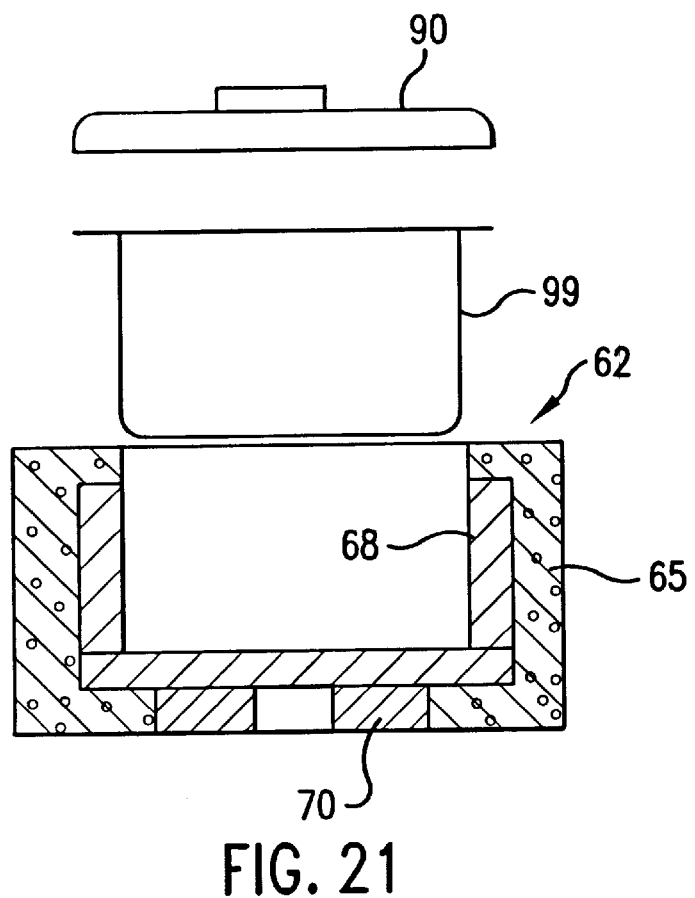
FIG. 21 is a simplified construction diagram of a thermoelectric refrigerator according to a seventh embodiment of the present invention.

FIG. 21 illustrates the seventh embodiment. A chilled server basin 62 is formed with a size and a depth large enough to permit insertion of a cooking pot 99 made, for example, of a metal, porcelain, glass or the like, so that a cooked dish can be served with the cooking pot 99 placed in the chilled server basin 62.

Figure 22:
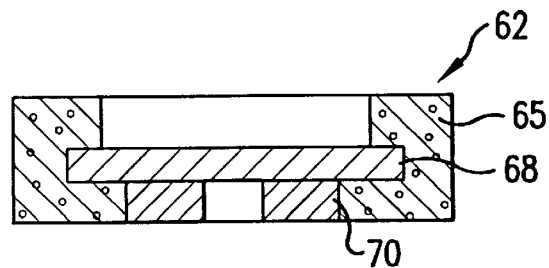
FIG. 22 is a simplified construction diagram of a thermoelectric refrigerator according to an eighth embodiment of the present invention.

FIG. 22 shows the eighth embodiment. In this case, a first thermal conductor 68 is in the form of a flat plate. A peripheral portion of the first thermal conductor 68 is embedded in a shallow heat-insulating casing 65. This chilled server basin 62 can be used, for example, as a chilling plate for cake or cheese. A cover member is not essential. This construction is also suited for a small chilled server basin or warm server basin.

Figure 23A:
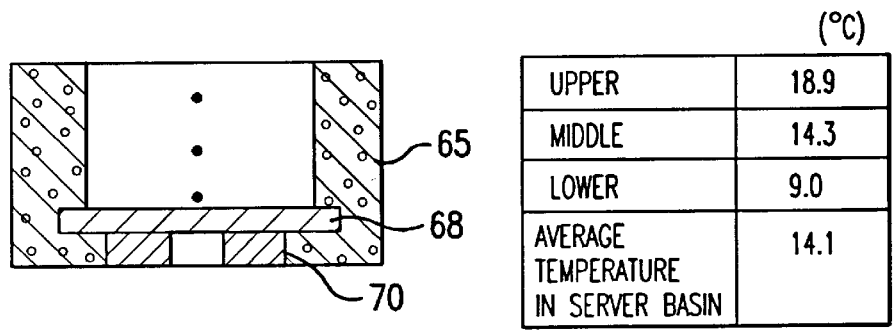
FIG. 23 shows simplified construction diagrams and temperature tables of chilled server basins employed in a test.
Figure 23B:
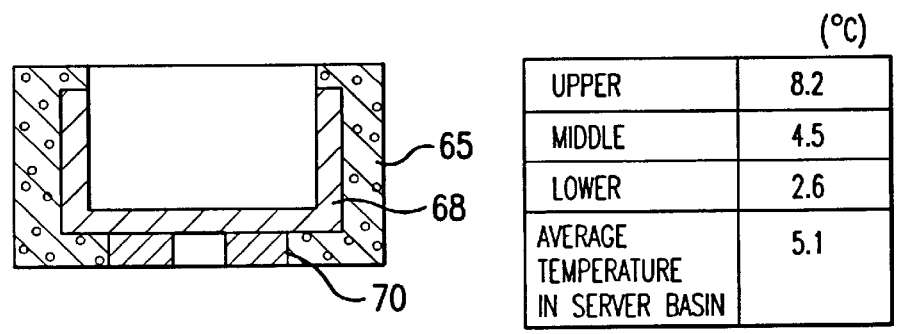
Figure 23C:
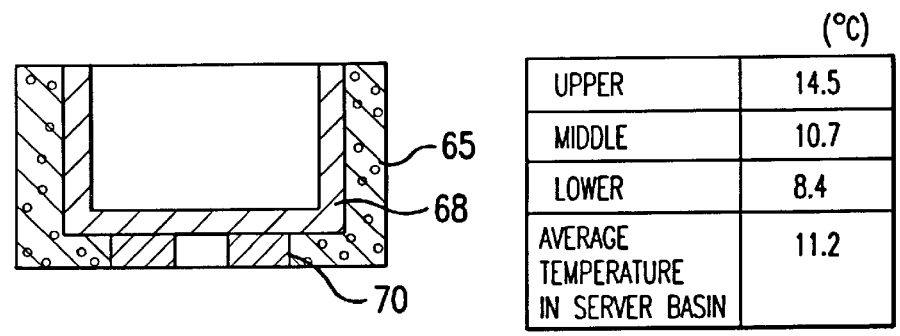

FIGS. 23(*a*) through 25(*d*) schematically illustrates the results of measurements of temperature distributions in chilled server basins of various constructions. In this test, the remaining other conditions such as the number of Peltier devices 70, the electric power fed to the Peltier devices and the flow rate of a heat transfer medium for the dissipation of heat were made equal. In each table, the positions "upper", "middle" and "lower" indicate temperatures measured at the corresponding positions shown in FIG. 23(*a*), and the average temperature in the server basin indicates an average of temperatures measured at 13 points in the server basin.

FIGS. 23(*a*) through 23(*c*) show chilled server basins which are each provided with the Peltier devices 70 arranged underneath a thermal conductor 68 and were each used without a cover 90, and FIGS. 23(*a*) through 23(*c*) show chilled server basins which are each provided with the Peltier devices 70 arranged underneath a thermal conductor 68 and were each used with a cover 90 attached thereto. The thermal conductors 68 are flat in FIGS. 23(*a*) and 24(*a*). The thermal conductors 68 have peripheral free edges not extending to openings of corresponding casings 65 in FIGS. 23(*b*) and 24(*b*). The thermal conductors 68 have peripheral free edges extending to opening of corresponding casings 65 in FIGS. 23(*c*) and 24(*c*).

FIGS. 25(*a*) and 25(*b*) illustrate chilled server basins which are each provided with the Peltier devices 70 arranged in the peripheral wall of the thermal conductor 68 and were each used without a cover 90. In FIG. 25(*a*), a peripheral free edge of the thermal conductor 68 extends to an opening of a casing 65. In FIG. 25(*b*), however, a peripheral free edge of the thermal conductor 68 does not extend to an opening of the casing 65. FIGS. 25(*c*) and 25(*d*) show chilled server basins which are each provided with the Peltier devices 70 arranged in the peripheral wall of the thermal conductor 68 and were each used with a cover 90 attached thereto. In FIG. 25(*c*), a peripheral free edge of the thermal conductor 68 extends to an opening of the casing 65. In FIG. 25(*d*), a peripheral free edge of the thermal conductor 68 does not extend to an opening of the casing 65.

Figure 24A:
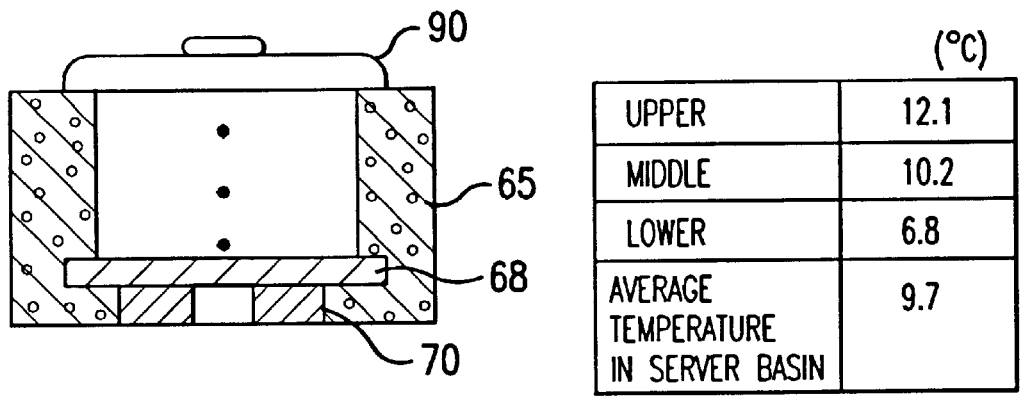
FIG. 24 illustrates simplified construction diagrams and temperature tables of chilled server basins employed in a test.
Figure 24B:
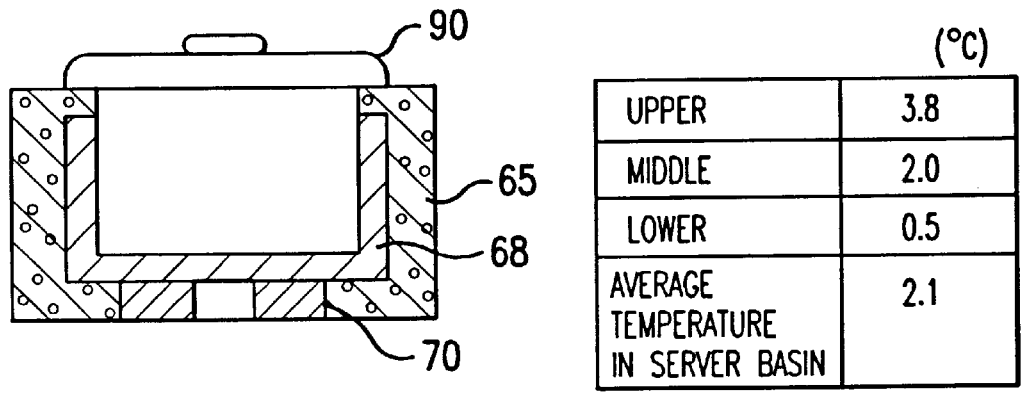
Figure 24C:
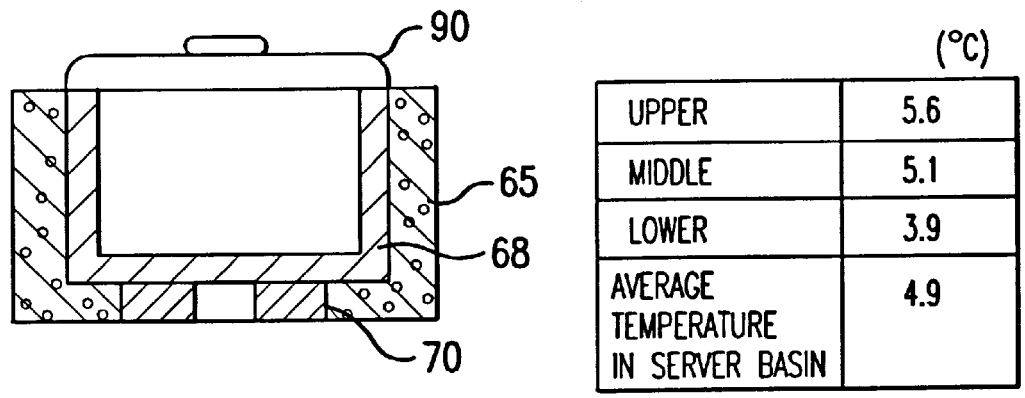
Figure 25A:
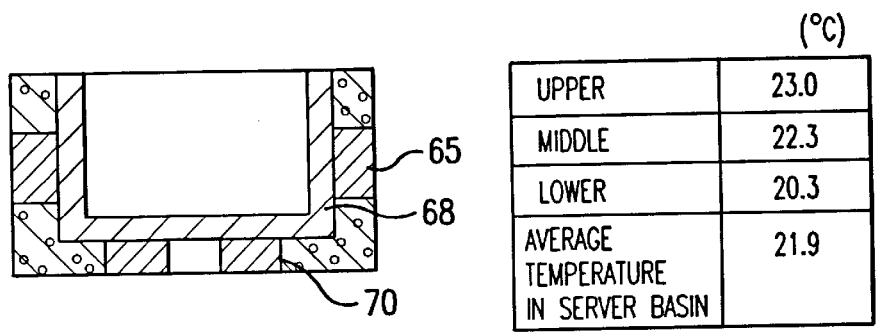
Figure 25B:
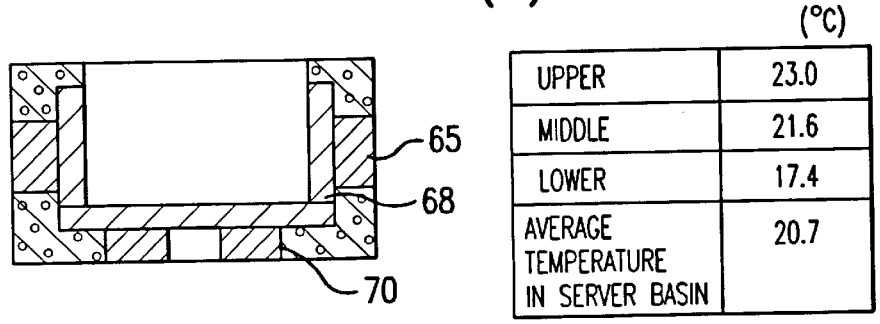
Figure 25C:
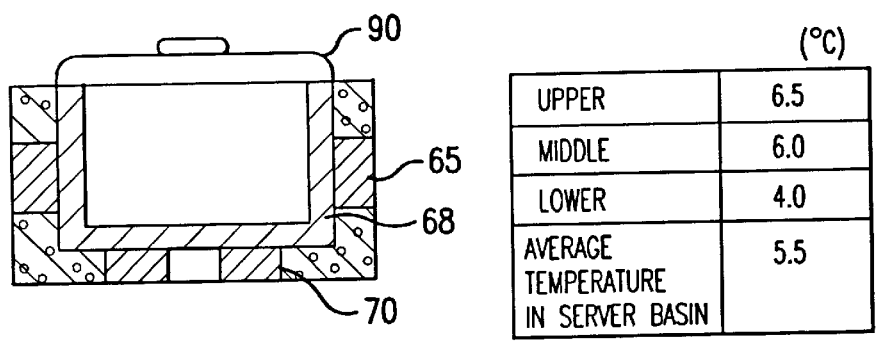
Figure 25D:
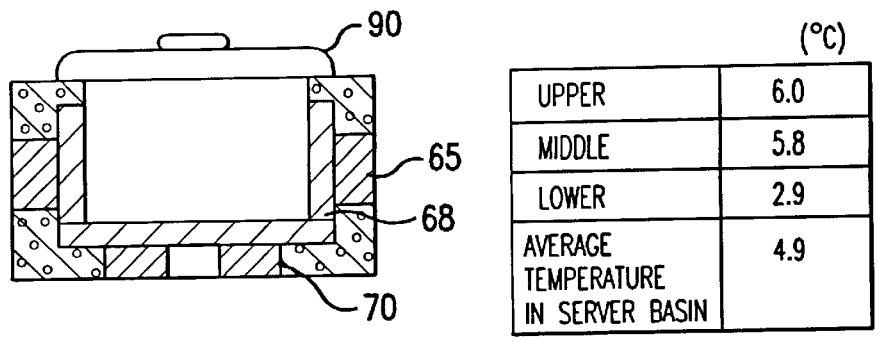

As will become apparent from a comparison, for example, between FIG. 23(*c*) and FIG. 25(*a*), the chilled server basin with the Peltier devices 70 arranged underneath the thermal conductor 68 can achieve lower interior temperatures at the respective positions than the chilled server basin with the Peltier devices 70 arranged in the peripheral wall although the peripheral free edges of the thermal conductors 68 similarly reach the openings of the corresponding casings 65 in both the chilled server basins. A similar conclusion can be derived from a comparison between FIG. 23(*b*) and FIG. 25(*b*), from a comparison between FIG. 24(*c*) and FIG. 25(*c*), and from a comparison between FIG. 24(*b*) and FIG. 25(*d*). In the present invention, excellent chilling effects are available especially where the peripheral free edge of the thermal conductor 68 does not extend to the opening of the heat-insulating casing 65 and moreover, the cover 90 is used.

In each of the above-described embodiments, the description was made about the chilled server basin or the refrigerator. The present invention is however not limited to such use. The present invention can also be applied equally when the temperature-controlled appliance in each of the embodiment is used as a freezer, as a warm storage appliance by reversing the direction of a current to be fed to the Peltier devices, or as a refrigerator/warm storage appliance which can be used either as a refrigerator or a warm storage appliance by changing over a current.

With reference to FIGS. 26 through 29, the defrosting appliance according to the ninth embodiment will be described.

Figure 26:
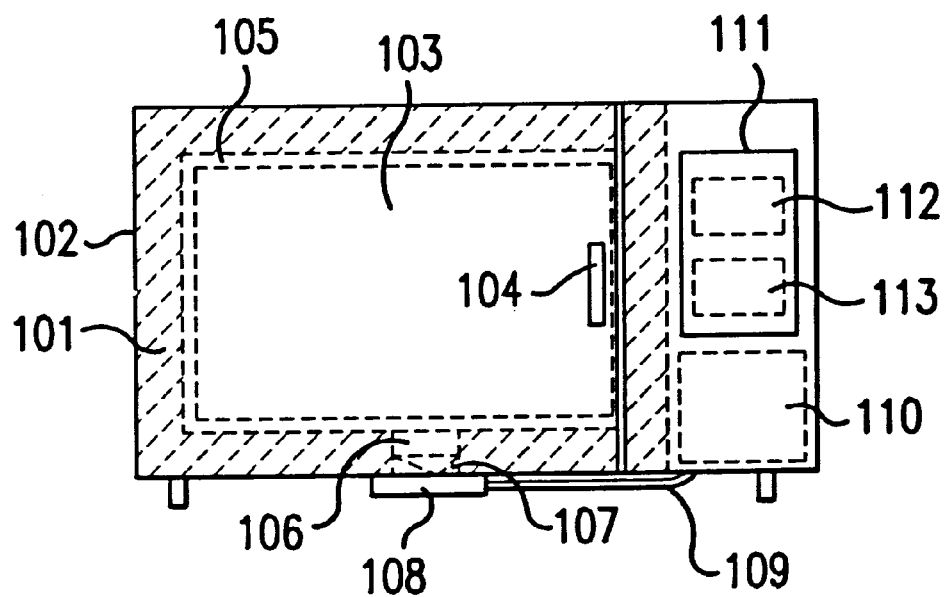
FIG. 26 is a front view of a defrosting appliance according to a ninth embodiment of the present invention
Figure 27:
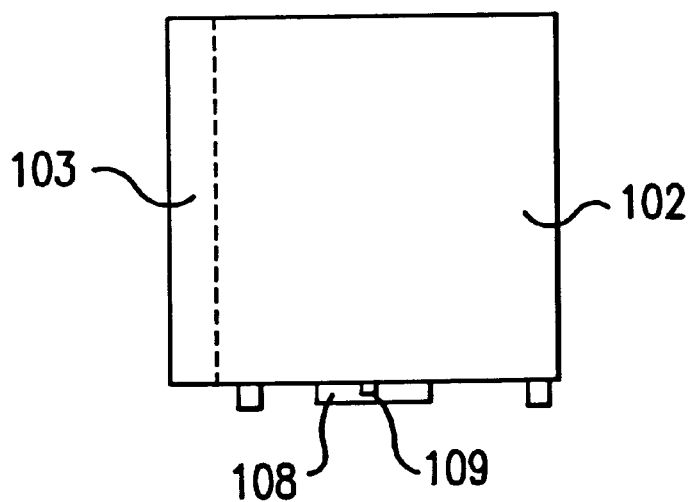
FIG. 27 is a side view of the defrosting appliance.

This specific example shows a compact defrosting appliance which is usable at home. A box-shaped casing 102 with a heat-insulating layer 101 formed on an inner side thereof, said heating insulating layer 101 being indicated by dashed hatching lines in FIG. 26, is provided through a front wall thereof with an opening. This opening is closed by a door 103 in a gas- and liquid-tight, see-through fashion. Designated at numeral 104 is a handle arranged on an outer surface of the door 103.

Figure 33:
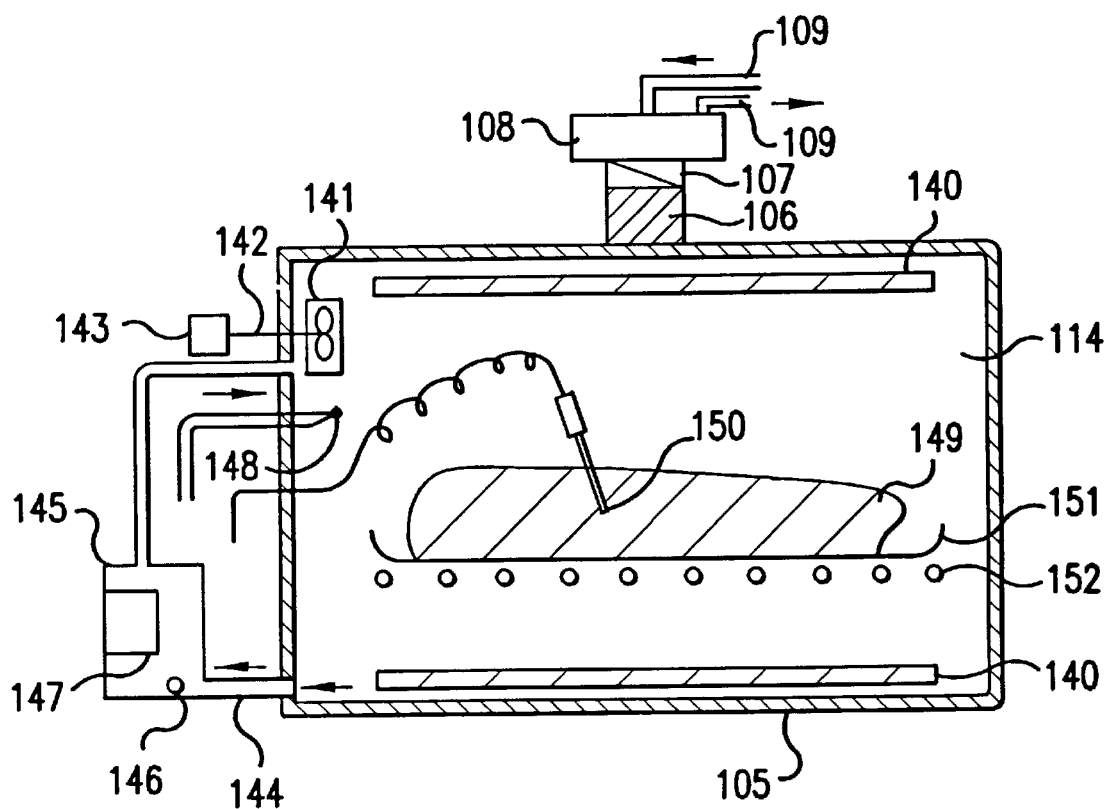
FIG. 33 is a simplified construction diagram of a defrosting appliance according to a tenth embodiment of the present invention.

On an inner side of the insulating layer 101, a box-shaped first thermal conductor 105 is arranged. The first thermal conductor 105 has a wide heat-conducting surface facing a storage space in the casing and is open at a front side. In close contact to a substantially central part of a lower side of the first thermal conductor 105, a Peltier device 107 of the cascaded construction is arranged via a second thermal conductor 106. Although the cooling unit is arranged in a lower part in FIG. 26, vertical temperature irregularity is reduced and freedom can hence be enjoyed with respect to the mounting position of the cooling unit, provided that the first thermal conductor 105 has a certain thickness (for example, about 3 mm). An example with a cooling unit arranged in an upper part is shown in FIG. 33 to be described subsequently herein.

A circulation jacket 108 for heat transfer medium is attached to a lower side of the Peltier device 107. Two pipes 109 are connected to the circulation jacket 108 for the heat transfer medium. The pipes 109 are also connected to a heat-dissipating (heat-absorbing) unit 110 disposed adjacent the heat-insulating layer 101. A control panel 111 is arranged above the heat-dissipating (heat-absorbing) unit 110. Behind the control panel 111, a control unit 112 and a power supply 113 are arranged.

Although not illustrated in the drawing, a light can be arranged inside the first thermal conductor 105. It is also possible to make the temperature uniform inside the first thermal conductor 105 and to improve transfer of heat to a food under defrosting by arranging a fan and rotating it at a low speed.

Figure 28:
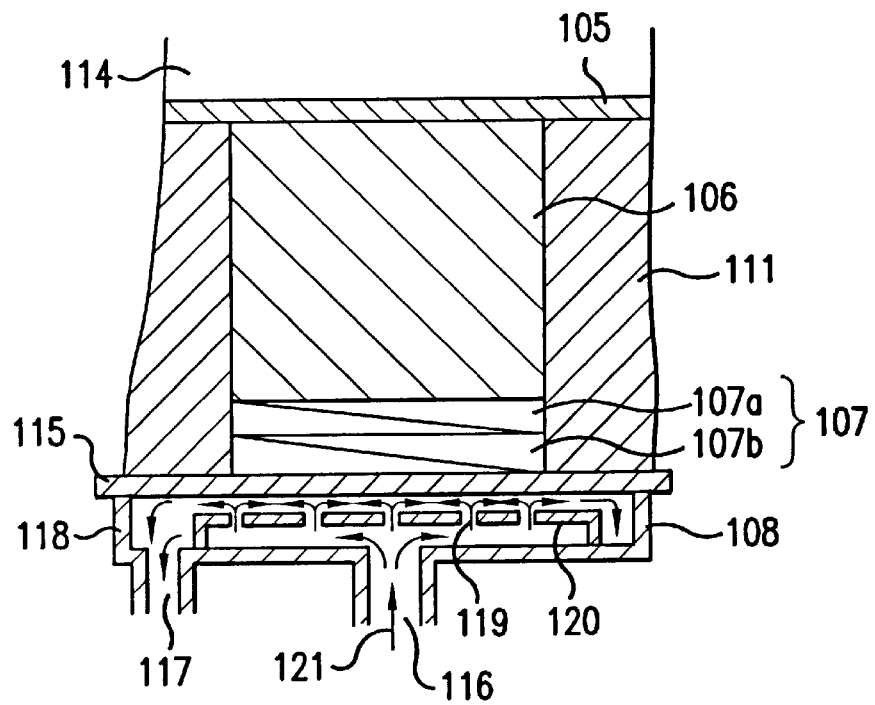
FIG. 28 is an enlarged cross-sectional view showing a Peltier device, a water-circulating jacket and their peripheral elements in the defrosting appliance.

In the enlarged cross-sectional view of FIG. 28, the Peltier device 107, the circulation jacket 108 for the heat transfer medium and their peripheral elements are shown. As is illustrated in the drawing, the first thermal conductor 105 is arranged like a lining on the heat-insulating layer 101, and an inner surface (heat-conducting surface) of the first thermal conductor 105 is located opposite a storage space 114.

In this specific example, the Peltier device 107 of the cascaded construction has a two-stage structure formed of an upper group of semiconductor chips 107a and a lower group of semiconductor chips 107b. The upper and lower groups are the same in the size and number of the mounted semiconductor chips. The detailed construction of this Peltier device 107 will be described later with reference to FIG. 29. Peripheries of the second thermal conductor 106 and the Peltier device 107 are covered by the heat-insulating layer 101. Although not shown in the drawing, a seal for the prevention of dew formation is applied around the Peltier device 107.

The circulation jacket 108 for the heat transfer medium is constructed of a heat-conducting plate 115 maintained in close contact with the Peltier device 107, a jacket case 118 joined to a lower side of the heat-conducting plate 115 and having an inlet 116 and an outlet 117, and a distributing plate 120 having a plurality of distributing holes 119 and arranged within the jacket case 118. As is indicated by arrows, the heat transfer medium 121 such as water enters through the inlet 116 of the jacket case 118, spreads along the distributing plate 120, and is injected toward the heat-conducting plate 115 from the individual distributing holes 119. Heat is transferred between the heat-conducting plate 115 and the heat transfer medium 121, and the heat transfer medium 121 is recovered and is sent from the outlet 117 to the heat-dissipating (heat-absorbing) unit 110 through the pipes 109. Incidentally, as is shown in FIG. 30, a circulating pump 122 is arranged in one of the pipes 109 at an intermediate point thereof and a fan 123 is arranged in the vicinity of the heat-dissipating (heat-absorbing) unit 110.

Figure 29:
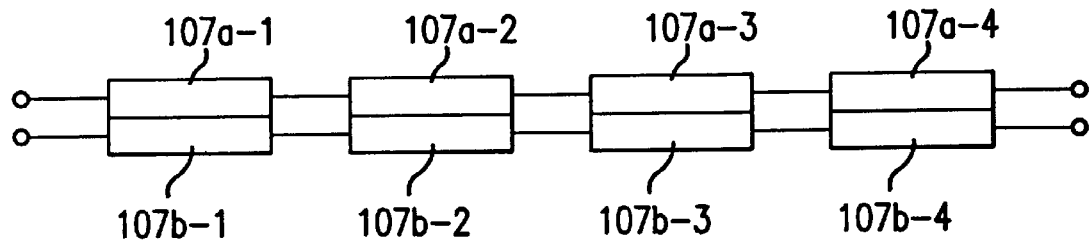
FIG. 29 is a schematic illustration showing one example of connection of chips in the Peltier device.

As is illustrated in FIG. 29, the Peltier device 107 of the cascaded construction has a stacked two-stage structure formed of the upper group of semi-conductor chips 107a and the lower group of semi-conductor chips 107b. The upper and lower groups are provided with substrates, respectively, and are the same in the size and number of the mounted semi-conductor chips. In this specific example, four sets of Peltier devices of the above-described construction are used. Four upper chip groups 107a-1 to 107a-4 are connected in series, while four lower chip groups 107b-1 to 107b-4 are connected in series. The Peltier device 107 is constructed in such a way that the values of voltages and currents applied to the upper chip groups 107a-1 to 107a-4 and to the lower chip groups 107b-1 to 107b-4 can be controlled independently. The values of voltages and currents applied to the respective groups are controlled so that the Peltier 107 can maintain its COP (coefficient of performance) high as a whole. Although the two-stage structure is adopted in this specific example, the Peltier device 107 can be formed into a multi-stage structure greater than the two-stage structure as needed.

Figure 30:
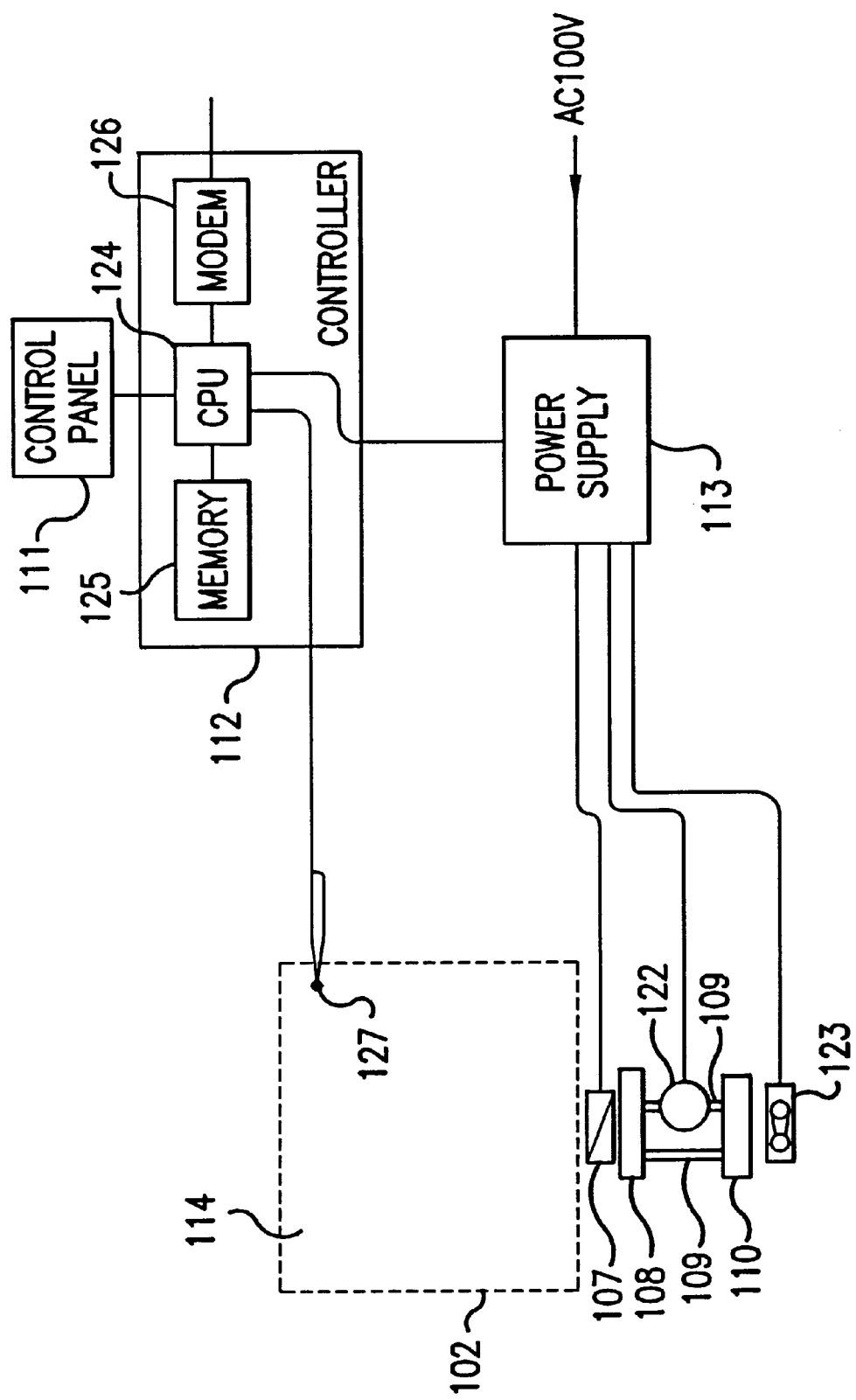
FIG. 30 is a diagram showing a control system of the defrosting appliance.

With reference to FIG. 30, the control system of the defrosting appliance will now be described. The control unit 112 is provided with a central processing unit (CPU) 124, a memory 5 having ROM and RAM, and a modem 126. As is shown in the diagram, the control panel 111, sensors (temperature sensor, humidity sensor and the like) 127 arranged at appropriate locations within the storage space 114, and the power supply unit 113 are connected to CPU 124.

Figure 31:
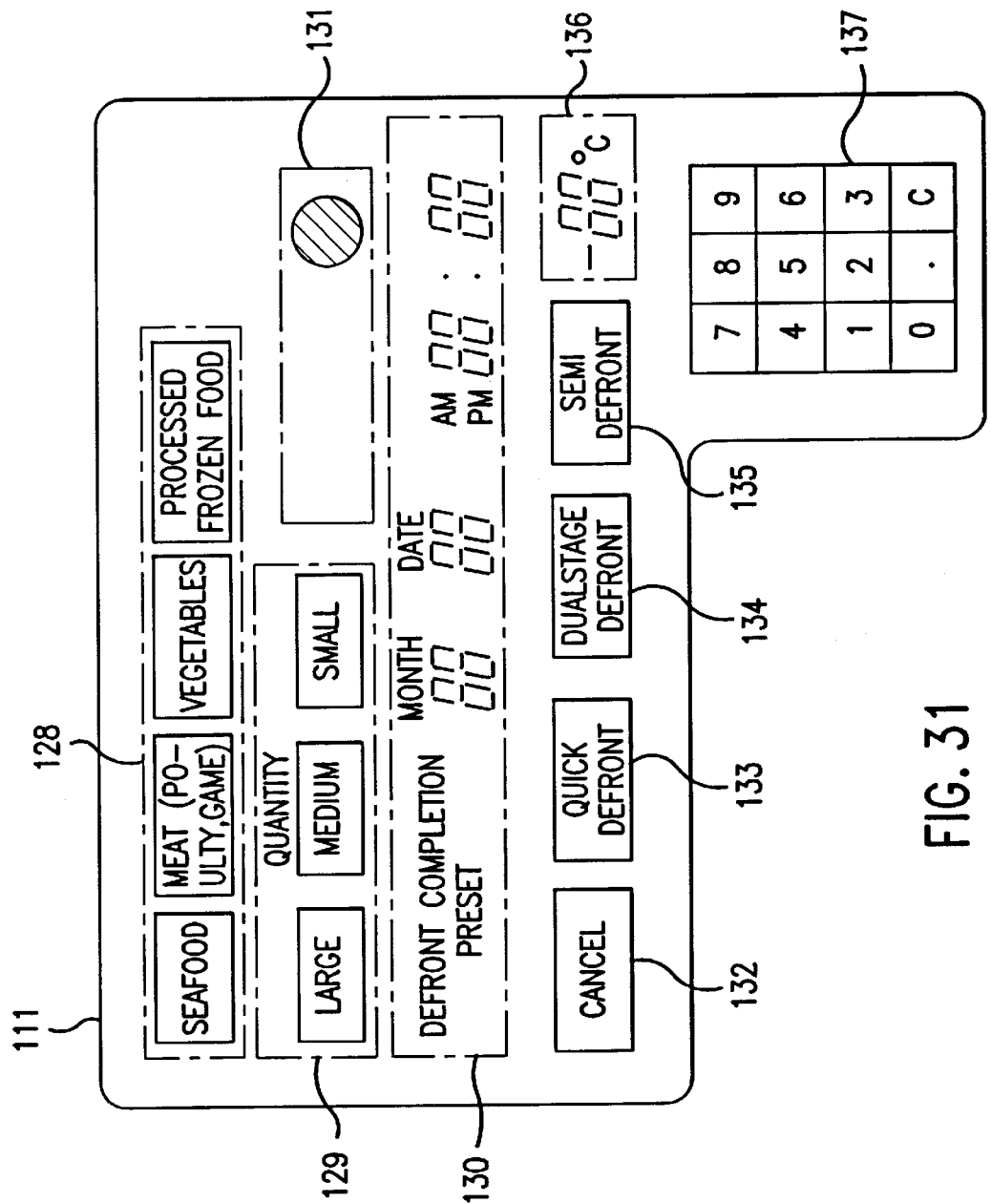
FIG. 31 is an enlarged plan view of a control panel in the defrosting appliance.

FIG. 31 illustrates one example of the control panel 111. In this example, the control panel 111 is provided with a defrosted food designation switch 128 for designating that a frozen food to be defrosted is a seafood such as fish, a livestock product such as meat, a vegetable such as a green, or a processed frozen food such as a flied food or noodles; a quantity designation switch 129 for roughly designating the quantity of the frozen food; a defrost completion time setting switch 130 for setting a defrost completion time; a modem mode lamp 131 which is turned on when a defrost presetting mode is designated from a remote location by telephone while using a modem; a preset canceling switch 132 for canceling the preset defrost mode; a quick defrost switch 133 for defrosting especially quickly; a dual-stage defrost switch 134 for performing dual-stage defrosting to avoid defrosting rigor; a semi-defrost switch 135 for defrosting a frozen food to a semi-extent; a temperature indicator 136 for showing a current interior temperature; a numeric keypad 137 for entering figures; and the like. Incidentally, these switches are formed of thin-film switches, and numerical values are indicated by liquid crystal displays.

In ROM of the memory 125, a number of defrosting patterns are programmed and stored beforehand, for example, by combining the following variables in various ways:

(1) Kinds of frozen foods [for example, frozen seafood, frozen meat (poultry or game), frozen vegetable, processed frozen food, etc.; or kinds obtained by dividing the former kinds more finely].

(2) Quantities of a frozen food (weights, volumes and the like).

(3) Defrosting modes such as normal defrosting, extremely quick defrosting, dual-stage defrosting, semi-defrosting and the like).

(4) Appropriate defrost completion temperatures corresponding to the kinds of frozen foods.

Figure 32A:
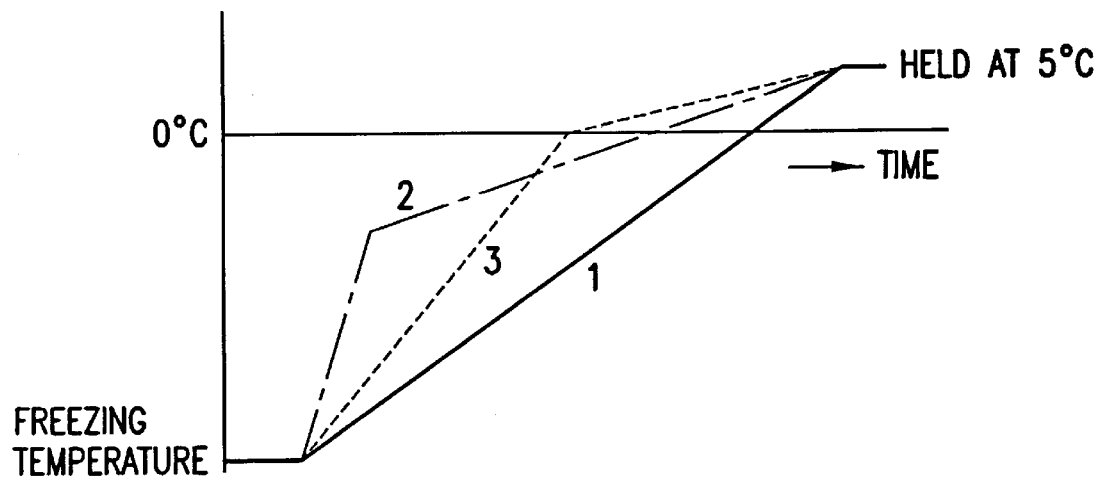
FIG. 32 is a concept diagram showing one example of a defrosting pattern in the defrosting appliance.
Figure 32B:
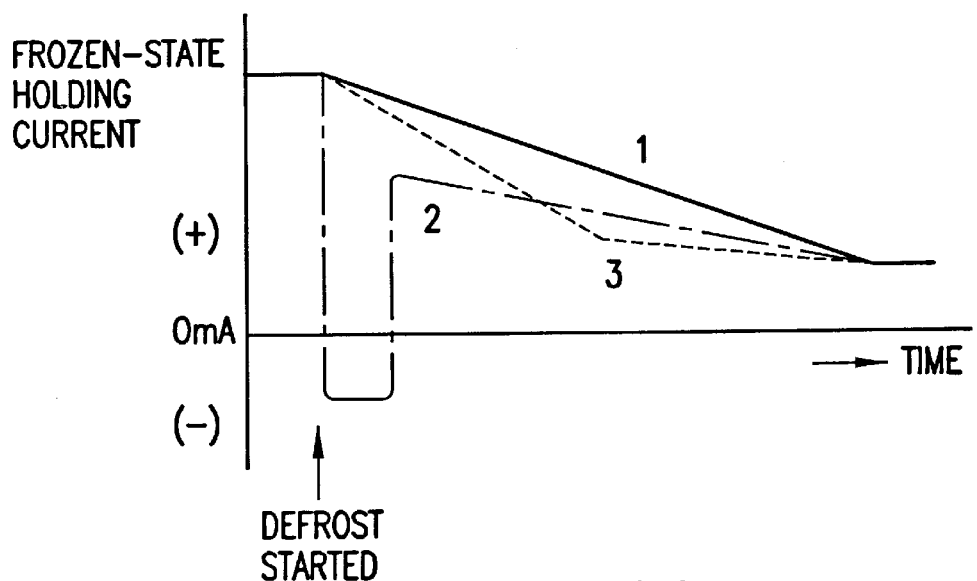

FIGS. 32(a) and 32(b) are concept diagrams showing examples of defrosting patterns. FIG. 32(a) shows a temperature pattern during defrosting, while FIG. 32(b) depicts a pattern of current fed to a Peltier device during defrosting.

The storage space 114 of the defrosting appliance shown in FIGS. 26 and 28 has been maintained in advance at a freezing temperature (for example, −18° C.). A frozen food to be defrosted has been placed there. Of the temperature patterns shown in FIG. 32(a), the temperature pattern ① is of the pattern that the temperature almost linearly rises from the freezing temperature (for example, −18° C.) toward a defrost completion temperature (for example, 5° C.). To conduct defrosting along this temperature pattern, a pattern of current to be fed to the Peltier device is set so that a current value almost linearly decreases like the current pattern ① in FIG. 32(b).

Of the temperature patterns shown in FIG. 32(a), the temperature pattern ② is of the temperature pattern that the temperature rising speed is made faster than the temperature pattern ① from a freezing temperature (for example, −18° C.) to about 0° C. and, after 0° C. is reached, the temperature rising speed is made slower than the temperature pattern ①. To conduct defrosting along this temperature pattern, a pattern of current to be fed to the Peltier device is set so that the decreasing speed of a current value is fast in the beginning and becomes slower from an intermediate point like the current pattern ② in FIG. 32(b).

According the temperature pattern ③ out of the temperature patterns shown in FIG. 32(a), the initial defrosting speed is the fastest so that quick defrosting is performed for a while. Like the current pattern ③ in FIG. 32(b), the polarity of a current is therefore reversed to heat the storage space 14 by the Peltier device for a predetermined time. The polarity of the current is then reversed back and after that, the decreasing speed of the current value is made slowest so that the defrost completion temperature is reached eventually.

When the temperature in the storage space 14 reaches the defrost completion temperature as described above, the value of current to be fed to the Peltier device is then made constant so that the defrost completion temperature is maintained. Although the defrost completion temperature is set at 5° C. in this specific example, it can be changed depending on the kind or the like of a frozen food to be defrosted. Further, the patterns linearly change in the examples shown in FIGS. 32(a) and 32(b). Patterns changing in curves or combinations of linear patterns and curved patterns are also feasible.

When a defrost completion time is set for a frozen food placed in a defrosting appliance (note: the storage space 14 has been maintained beforehand in a frozen state) by the numeric keypad 137 or by telephone through the modem, CPU 24 of the control unit 112 (see FIG. 30) performs an operation to compute a defrost starting time from the thus-set defrost completion time and a current time (which is detected by a built-in timer), an operation to select an optimal defrosting pattern from the various defrosting patterns stored in the memory 125, and the like. When the defrost starting time is found to have been reached in reference to the timer, defrosting is started in accordance with the thus-selected defrosting pattern and is completed at the preset defrost completion time. The operation of the defrosting appliance is then controlled so that the food is maintained at an optimal defrost completion temperature.

The defrosting appliance according to the tenth embodiment of the present invention will hereinafter be described with reference to FIG. 33. A heat-insulating layer and the like are omitted in the drawing for the sake of simplification. In this specific example, a second thermal conductor 106, a Peltier device 107, a circulation jacket 108 and the like are arranged above a first conductor 105.

Inside a storage space 114, infrared-ray-emitting heater plates 140 are arranged in a vertically opposite relationship or in a horizontally opposite relationship (in the vertically opposite relationship in this specific example). Although not shown in the drawing, the heater plates 140 are coated with ceramics. In this specific example, the Peltier device 107 and the heater plates 140 are used in combination upon defrosting. As an alternative, it is also possible to use the Peltier device 107 in combination with another defrosting means such as high-frequency waves or microwaves.

To eliminate a temperature distribution within the storage space 14, a fan 41 is internally arranged and is rotated at a low speed by a motor 143 via a heat-insulated shaft 142. Instead of the fan 141, a motor-equipped fan of the low-temperature-resistant type may also be arranged within the storage space 114.

A portion of air inside the storage space 114 is drawn through a draw pipe 144 and is fed to a humidity control compartment 145. A humidity sensor 146 and a dehumidifier/humidifier 147 are arranged in the humidity control compartment 145 so that by the humidity sensor 146 and the dehumidifier/humidifier 147, the storage space 114 is maintained at a humidity suited for defrosting. For each kind of foods to be defrosted, this optimal humidity range and the manner of humidification are stored beforehand in a memory 125 (see FIG. 34). In this specific example, the humidity control compartment 145 is arranged in addition to the storage space 114, and the humidity sensor 146 and the dehumidifier/humidifier 147 are arranged there. As an alternative, the humidity sensor 146 and the dehumidifier/humidifier 147 may also be arranged in the storage space 114.

In this specific example, there are also arranged an interior temperature sensor 148 for detecting a temperature in the storage space 114 and a contact-type temperature sensor 150 for detecting an internal temperature or surface temperature of a food 149 to be defrosted. By both of the sensors 148,150, feed-back control of the defrosting is performed. Designated at numeral 151 in the drawing is a support for a plate 151. The support 152 may be a rotatable one. It is also possible to automatically measure the weight (quantity) of the food 149 to be defrosted and then to transmit a measurement signal to a control unit 112 (see FIG. 34) by placing the food 149 on the plate 151.

Figure 34:
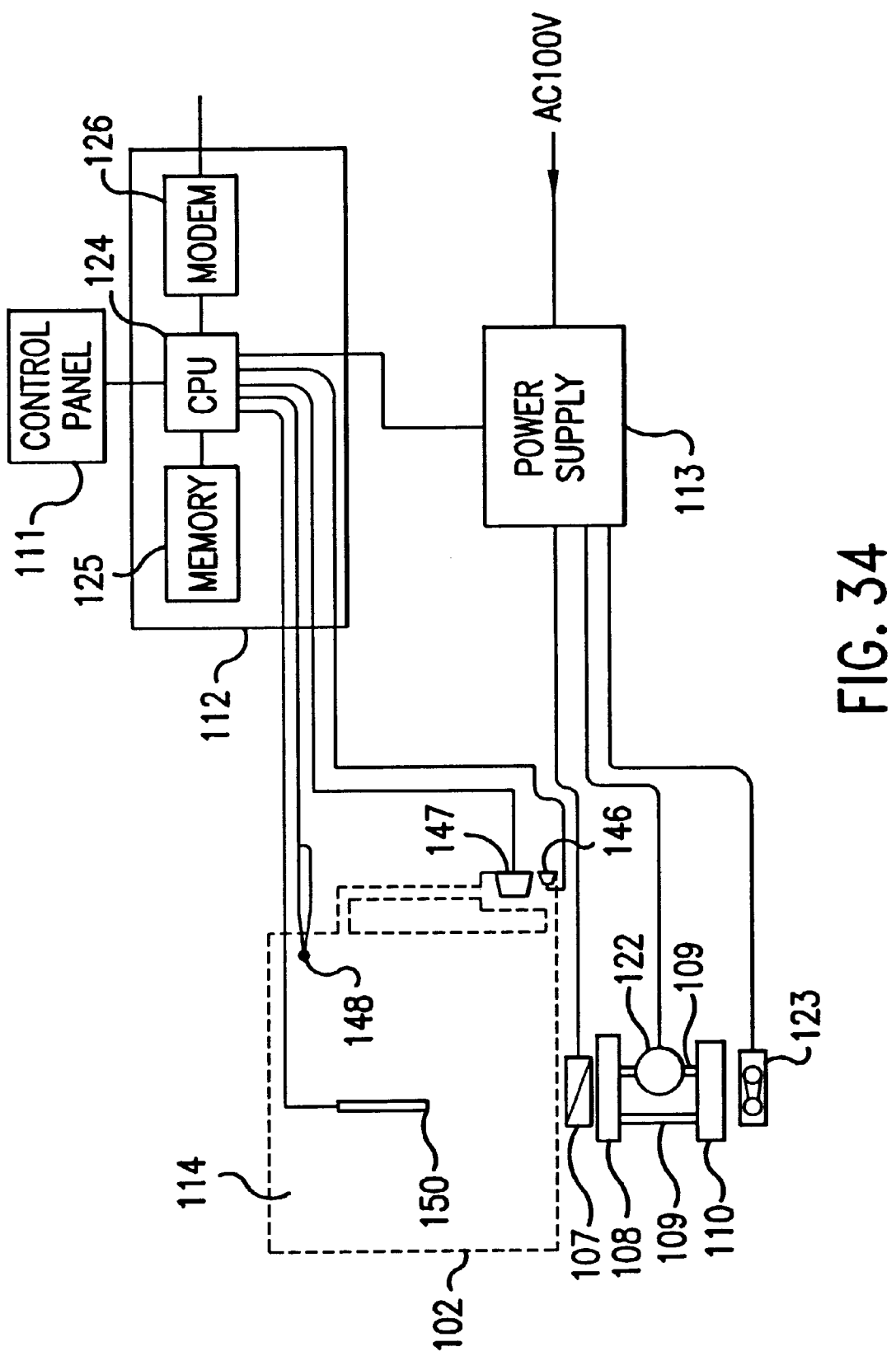
FIG. 34 is a diagram showing a control system of the defrosting appliance.

FIG. 34 illustrates the control system for the defrosting appliance according to this embodiment. As is illustrated in the diagram, the humidity sensor 146, the dehumidifier/humidifier 147, the interior temperature sensor 148 and the contact-type temperature sensor 150 are all connected to CPU 124 via a bus.

The defrosting appliance according to the present invention can also be used as a freezer or a refrigerator without any structural modification. Upon storing, for example, vegetables or fruits under refrigeration, a controlled atmosphere (CA) function can be added to properly control the concentration of nitrogen gas within the storage space.

To allow a user to change the color of the outer surface of the defrosting appliance as desired, it may be possible to replaceably adhere a color panel on the outer panel of the defrosting appliance. This color panel may be formed, for example, by coating a back side of an aluminum foil (thickness: about 0.1 mm) with a tacky adhesive, applying a sheet of release paper over the tacky adhesive, applying a desired one of various prints with a pastel color or the like to a front side of the aluminum foil and then cutting the resultant aluminum foil into a size corresponding to outer dimensions of the defrosting appliance.

When the defrosting appliance according to this invention is used as a freezer, quick freezing is feasible if a container of the double-walled structure (for example, in the form of a bag or carton) with a liquid substance hermetically sealed therein, said liquid substance being not solidified even at −30 to −40° C., is cooled beforehand to an extremely low temperature in the freezer and a food to be frozen is inserted in an interior space of the container and then placed in the freezer.

The construction of a combined temperature-controlled appliance, including a quick freezing compartment, is similar to the above-described first embodiment, and its description is therefore omitted herein.

Figure 35A:
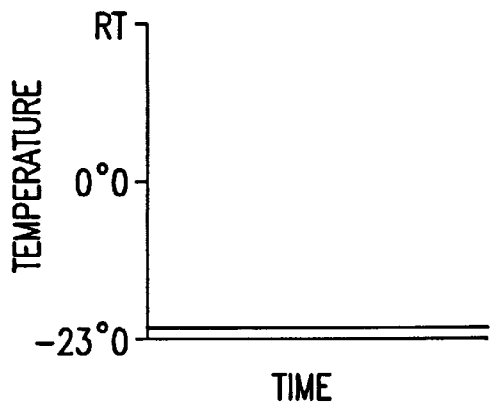
FIG. 35 diagrammatically illustrate various freezing patterns.
Figure 35B:
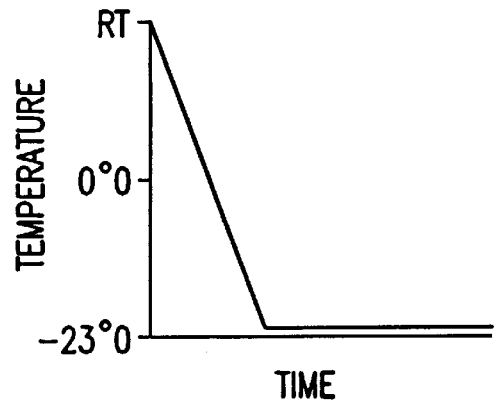
Figure 35C:
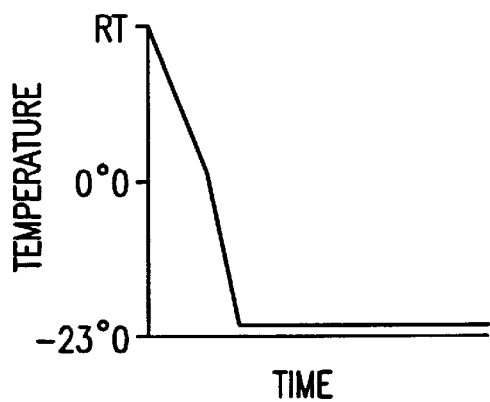
Figure 35D:
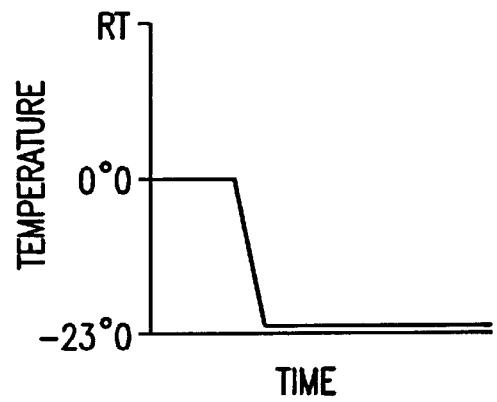
Figure 36:
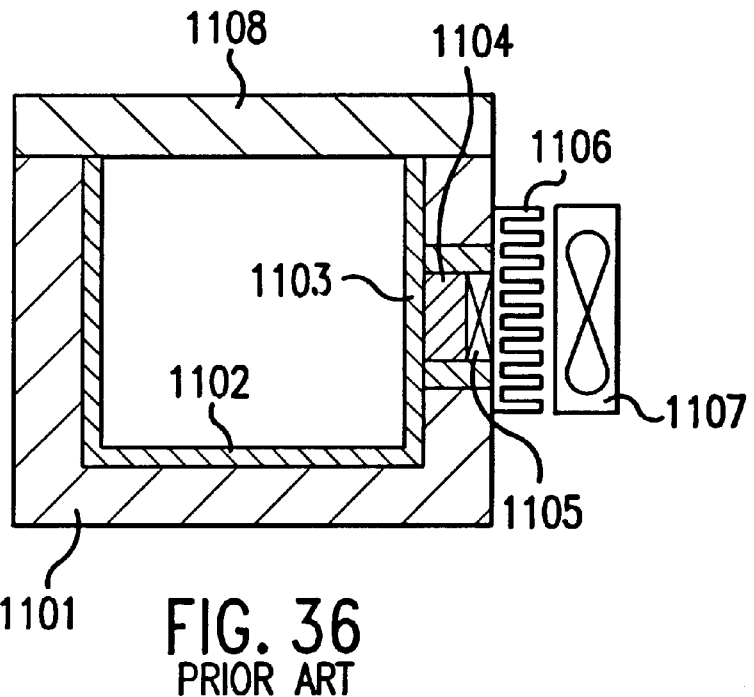
FIG. 36 is a cross-sectional view of a conventional thermoelectric refrigerator.
Figure 37:
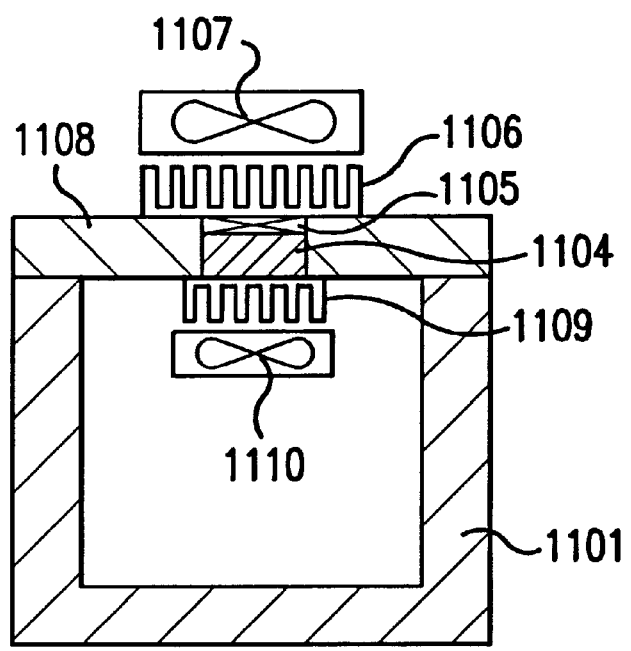
FIG. 37 is a cross-sectional view of another conventional thermoelectric refrigerator.

FIGS. 35(a) through 35(d) diagrammatically illustrate examples of freezing patterns. FIG. 35(a) shows an example in which the interior of a quick freezing compartment has always been set and maintained at a predetermined freezing temperature (for example, −23° C.) before use. FIG. 35(b) illustrates another example in which, after a food is placed in the quick freezing compartment, a power switch is turned on to lower the interior temperature from room temperature (RT) to −23° C. in a short period of time and the freeze completion temperature is then maintained. FIG. 35(c) depicts a further example in which, after a food is placed in the quick freezing compartment, the power switch is turned on to once lower the interior temperature from room temperature (RT) to around 0° C., the interior temperature is then lowered to −23° C., and this freeze completion temperature is thereafter maintained. FIG. 35(d) depicts a still further example in which the interior temperature has been maintained beforehand around 0° C. before placing a food in the quick freezing compartment, the interior temperature is then lowered to −23° C. after placing the food in the quick freezing compartment, and the freeze completion temperature is thereafter maintained.

These various freezing patterns have been stored beforehand in a control unit (not shown), and a suitable one of the freezing patterns can be selected depending on the kind of a food to be frozen (for example, an animal food such as fish, meat, poultry or game, a vegetable food such as a vegetable or fruit, a processed food such as a flied food, or a confectionery or the like), its conditions [for example, the size, and whether or not it is placed in a container such as a Tupperware (trade mark)] and the like.

Upon freezing an animal food or a vegetable food, there are important issues from the standpoint of quality, that is, in what state ice is formed in the food by freezing and whether or not its cells and/or texture are damaged by the ice. A high freezing speed generally tends to result in formation of small pieces of ice in cells (intracellular freezing), whereas a relatively low freezing speed generally tends to lead to formation of ice outside cells (extracellular freezing).

In an animal food such as fish, meat, poultry or game, cells are in the form of fibers so that intracellular freezing which forms small pieces of ice permits better reconstitution and features a lower quality deterioration of the food upon defrosting than extracellular freezing. In contrast, a vegetable food such as a vegetable or fruit is formed of spherical cells, which contain vacuoles therein and are covered at outer sides thereof by cell walls. Depending on conditions of freezing, the cell walls may be caused to rupture by an abruptly expanding pressure so that the cells or the texture may be damaged. If extracellular freezing is effected at a relatively high freezing temperature of about −10° C. or so, cells remain alive so that after defrosting, the cells absorb water and regain their original state.

The water content and hence, the freezing resistance considerably differs from one food to another even among the animal foods, for example, between beef or pork and lobster or crab meat or even among the vegetable foods, for example, among corns or beans, green onion and fruits. In view of this, it is also necessary to strictly bring freezing conditions into conformity with a food to be frozen. The freezer according to the present invention can achieve desired freezing conditions by controlling electric power to be fed to the Peltier device and moreover, can always maintain a preset freezing temperature without variations.

The temperature-controlled appliances according to the present invention are applicable to a variety of fields other than foods, for example, to cosmetics, samples, chemicals and blood.

ADVANTAGES OF THE INVENTION

The temperature-controlled appliance according to the first aspect of the present invention as described in claim 1 is provided with a plurality of independent temperature-controlled compartments arranged closely to each other as described above, whereby these compartments can each be used independently, for example, as a refrigerator, a frozen storage compartment, a quick freezing compartment, a defrosting compartment, a warm storage compartment, a chilled server basin, a warm server basin or the like in general. These compartments can hence be used in diversified ways. The temperature-controlled appliance can be conveniently used. If it is desired, for example, to freeze a large quantity of foods, plural ones of the temperature-controlled compartments, as many as needed depending on the quantity, can be used by setting their temperatures at a level sufficient to use them as quick freezing compartments. This makes it possible to process the foods at once so that the work can be made efficient. This is certainly convenient.

When the temperature-controlled compartments are mounted on a wagon and are hence movable as described in claim 2, the temperature-controlled compartments can be moved to a place where they are needed. This embodiment can be used more conveniently.

When the plural temperature-controlled compartments are arranged underneath a table as described in claim 3, foods and/or cooking ingredients taken out of the temperature-controlled compartments can be immediately placed on the table for use in cooking or the like. This embodiment can be used conveniently.

When each temperature-controlled compartment is provided with its own temperature setting unit as described in claim 4, the temperature-controlled compartment can be used in diversified ways.

According to the second aspect of the present invention as described in claim 5, a Peltier device is arranged on a rear side of a surface of a thermal conductor, said surface being located opposite an opening of a heat-insulating casing (for example, in a bottom portion of a metallic container), so that substantially uniform cooling or heating is feasible by the thermal conductor throughout a storage space in the heat-insulating casing. As a consequence, the Peltier device is arranged at a position remote from the opening of the heat-insulating casing so that the Peltier device is less affected thermally by the surrounding atmosphere (an external disturbance). Owing to these features, this embodiment can achieve a good thermal efficiency in cooling or heating so that smaller power consumption is needed. This embodiment can therefore provide a cold/warm storage appliance which requires a low running cost.

According to the third aspect of the present invention as described in claim 6, the cold/warm storage appliance equipped with an opening, which can be opened upwards, is arranged on an upper part of a wagon. By making the cold/warm storage appliance kept open, it is unnecessary to open and close a door during work such as cooking. In addition, it is possible to have dinner while maintaining cooked foods at constant temperatures, respectively. It is therefore possible to prevent the cooked foods from becoming warmer or conversely cooler, that is, from being deteriorated in tastes in the course of dinner. Further, the cold/warm storage appliance is mounted on the wagon and can be easily moved to a place where it is needed (for example, to a place near a cooking table or a dining table). The cold/warm storage appliance can be used very conveniently.

When the thermal conductor is provided at a periphery thereof with an upright portion as described in claim 7, a large cooling area and/or a large heating area can be obtained surely. Excellent cooling and/or heating effects can therefore be obtained.

When the thermal conductor is in the form of a plate as described in claim 8, the cold/warm storage appliance can be formed smaller and, for example, simple cooking or the like can be conducted on the thermal conductor.

When the thermal conductor has an upright portion and is constructed so that a free edge of the upright portion does not extend to the opening of the heat-insulating casing as described in claim 9, thermal influence from the surrounding atmosphere can be reduced so that excellent cooling and/or heating effects can be obtained.

When the free edge of the thermal conductor is covered by a portion of the heat-insulating casing as described in claim 10, thermal influence from the surrounding atmosphere can be reduced so that excellent cooling and/or heating effects can be obtained.

When the appliance is provided with a cover member which openably closes up the opening of the heat-insulating casing as described in claim 11, thermal influence from the surrounding atmosphere can be reduced so that excellent cooling and/or heating effects can be obtained. It is also possible to prevent entry of dust and the like.

When the appliance is provided with an inner cover between the heat-insulating casing and the cover member as described in claim 12, excellent cooling and/or heating effects can be obtained.

When a plurality of cold/warm storage appliances are arranged and their interior temperatures are individually controllable as described in claim 13, various combinations are feasible including, for example, chilling and cold storage, freezing and cold storage, freezing and defrosting, cold storage and warm storage, and cold storage and warm storage. It is therefore possible to use the plurality of cold/warm storage appliances in various ways. The the plurality of cold/warm storage appliances can therefore be used conveniently.

When the cold/warm storage appliances are connected to a common heat-dissipating or heat-absorbing system as described in claim 14, the construction can be simplified so that the manufacturing cost can be reduced.

When the heat-dissipating or heat-absorbing system is a forced circulation system for a heat transfer medium as described in claim 15, excellent cooling and/or heating effects can be obtained, thereby permitting quick freezing and/or quick warming.

When a battery is mounted on the wagon as a power supply for the Peltier device as described in claim 17, a power cord is not needed. The cold/warm storage appliance can be conveniently used outdoors or in a like place.

When the cover member also functions as a table as described in claim 18, the cold/warm storage appliance can be conveniently.

According to the fourth aspect of the present invention as described in claim 19, a storage space in a casing can be controlled in a desired defrosting state by controlling electric power to be fed to a Peltier device. It is therefore possible to easily set or change a defrost completion temperature which considerably affects the quality of a food at the time of completion of defrosting and to easily maintain the defrost completion temperature. The food is therefore obtained in a good defrosted state without any substantial deterioration in quality. A defrosting appliance having excellent reliability can therefore be provided.

According to the fifth embodiment of the present invention as described in claim 27, a storage space in a casing can be controlled in a desired defrosting state by controlling electric power to be fed to a Peltier device. It is therefore possible to control intracellular freezing and extracellular freezing both of which considerably affect the quality. A defrosting appliance having excellent reliability without any substantial quality deterioration can be provided.

What is claimed is:

1. In a temperature-controlled appliance provided with a plurality of mutually-independent temperature-controlled compartments arranged close to each other, the improvement wherein each of said temperature-controlled compartments comprises:

a casing formed of a heat-insulating layer;

a thermal conductor arranged in said casing and provided with a heat-conducting surface located opposite a storage space in said casing;

a Peltier device thermally connected with said thermal conductor;

a power supply for feeding electric power to said Peltier device;

a controller for controlling electric power to be fed to said Peltier device so that a temperature in said casing is controlled; and a heat-dissipating system or a heat-absorbing system to which said individual temperature-controlled compartments are commonly connected such that a heat transfer medium is forcedly circulated through said heat-dissipating system or said heat-absorbing system.

2. A temperature-controlled appliance according to claim 1, wherein said plurality of mutually-independent temperature-controlled compartments are mounted on a wagon so that said plurality of mutually-independent temperature-controlled compartments are movable.

3. A temperature-controlled appliance according to claim 1, wherein said plurality of mutually-independent temperature-controlled compartments are arranged underneath a table.

4. A temperature-controlled appliance according to claim 1, wherein said plurality of mutually-independent temperature-controlled compartments are individually provided with separate temperature-setting panels.

5. A temperature-controlled appliance according to claim 1, wherein
said Peltier device is arranged on a rear side of a surface of said thermal conductor, said surface being located opposite an opening of said casing.

6. A temperature-controlled appliance according to claim 2, wherein at least one of said plurality of temperature-controlled compartments is arranged on an upper part of said wagon and is provided with an opening which can be opened upward.

7. A temperature-controlled appliance according to claim 1, wherein said thermal conductor has an upright portion along a periphery thereof.

8. A temperature-controlled appliance according to claim 1, wherein said thermal conductor is in the form of a plate.

9. A temperature-controlled appliance according to claim 7, wherein a free edge of said upright portion does not extend to an opening of said casing.

10. A temperature-controlled appliance according to claim 9, wherein said upright portion of said thermal conductor is covered by a portion of said casing.

11. A temperature-controlled appliance according to claim 6, wherein said appliance further comprises a cover member which openably closes up said opening of said casing.

12. A temperature-controlled appliance according to claim 11, wherein said appliance further comprises an inner cover detachably arranged between said casing and said cover member.

13. A temperature-controlled appliance according to claim 2, wherein a battery is mounted on said wagon as a power supply for said Peltier device.

14. A temperature-controlled appliance according to claim 11, wherein said cover member also functions as a table.

15. A temperature-controlled appliance according to claim 1, wherein
at least one of said plurality of temperature-controlled compartments is used as a defrosting compartment, and said controller of said at least one temperature-controlled compartment controls electric power to be fed to said Peltier device such that a defrosting state of said at least one temperature-controlled compartment is controllable.

16. A temperature-controlled appliance according to claim 15, wherein various defrosting patterns, which correspond to kinds of foods to be defrosted, are stored beforehand in said controller.

17. A temperature-controlled appliance according to claim 15, wherein said controller is provided with defrost presetting means.

18. A temperature-controlled appliance, comprising:
a casing formed of a heat-insulating layer;
a thermal conductor arranged in said casing and provided with a heat-conducting surface located opposite a storage space in said casing;
a Peltier device thermally connected with said thermal conductor;
a power supply for feeding electric power to said Peltier device; and
a controller for controlling electric power fed to said Peltier device such that said storage space in said casing is controlled during defrosting;
wherein said controller is provided with a defrost presetting unit, and a modem for presetting the defrosting via a telephone.

19. A temperature-controlled appliance according to claim 15, wherein said controller is provided with defrost completion temperature presetting means.

20. A temperature-controlled appliance according to claim 15, wherein said appliance is provided with humidity control means for controlling a humidity within said casing.

21. A temperature-controlled appliance according to claim 1, wherein various freezing patterns, which correspond to kinds of foods to be frozen, are stored beforehand in said controller.

22. A temperature-controlled appliance according to claim 21, wherein said controller is provided with freezing completion temperature presetting means.

23. A temperature-controlled appliance according to claim according to claim 15, wherein said Peltier device has a cascaded construction.

24. A temperature-controlled appliance according to claim 15, wherein said appliance is provided with means for changing the polarity of a current to be fed to said Peltier device.

25. A temperature-controlled appliance according to claim 1, wherein at least two of said plurality of temperature-controlled compartments are set as a freezing compartment and a frozen storage compartment, respectively.

26. A temperature-controlled appliance according to claim 1, wherein at least three of said plurality of temperature-controlled compartments are set as a freezing compartment, a frozen storage compartment and a defrosting compartment, respectively.

27. A temperature-controlled appliance according to claim according to claim 21, wherein said Peltier device has a cascaded construction.

28. A temperature-controlled appliance according to claim 21, wherein said appliance is provided with means for changing the polarity of a current to be fed to said Peltier device.

* * * * *